(12) United States Patent
Nakamura et al.

(10) Patent No.: US 9,357,128 B2
(45) Date of Patent: May 31, 2016

(54) INFORMATION PROCESSING TERMINAL, INFORMATION PROCESSING METHOD, AND PROGRAM

(71) Applicant: SONY CORPORATION, Minato-ku (JP)

(72) Inventors: Takatoshi Nakamura, Kanagawa (JP); Atsushi Shionozaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/360,750

(22) PCT Filed: Nov. 28, 2012

(86) PCT No.: PCT/JP2012/007650
§ 371 (c)(1),
(2) Date: May 27, 2014

(87) PCT Pub. No.: WO2013/084450
PCT Pub. Date: Jun. 13, 2013

(65) Prior Publication Data
US 2014/0300766 A1    Oct. 9, 2014

(30) Foreign Application Priority Data
Dec. 6, 2011    (JP) .................................. 2011-266862

(51) Int. Cl.
*H04N 5/232* (2006.01)
*G03B 17/18* (2006.01)

(52) U.S. Cl.
CPC ............ *H04N 5/23248* (2013.01); *G03B 17/18* (2013.01); *H04N 5/23258* (2013.01); *H04N 5/23293* (2013.01); *G03B 2217/005* (2013.01); *G03B 2217/185* (2013.01)

(58) Field of Classification Search
CPC .................... H04N 5/23248; H04N 5/23258
USPC .......................... 348/333.02, 333.03, 333.04
See application file for complete search history.

(56) References Cited

U.S. PATENT DOCUMENTS

2005/0057660 A1*  3/2005  Nonaka et al. ............ 348/208.99
2011/0234826 A1*  9/2011  Nguyen et al. ............. 348/208.6

FOREIGN PATENT DOCUMENTS

| JP | 2006-174105 A | 6/2006 |
| JP | 2006-324948 A | 11/2006 |
| JP | 2008-22300 A | 1/2008 |
| JP | 2009-65248 A | 3/2009 |

OTHER PUBLICATIONS

International Search Report issued Jun. 27, 2013 in PCT/JP2012/007650.

* cited by examiner

*Primary Examiner* — James Hannett
(74) *Attorney, Agent, or Firm* — Chip Law Group; Pramod Chintalapoodi

(57) ABSTRACT

The present technology relates to an information processing terminal, an information processing method, and a program capable of naturally suppressing camera shake with a target object being arranged at a certain position on an image. An information processing terminal of an aspect of the present technology includes an imaging unit that takes an image; a display unit that displays the taken image; a measuring unit that measures a motion occurring in the terminal itself; and a display control unit that displays an indicator composed of a plurality of components arranged in a nested structure on the image and varies a position and a size of each component in accordance with the motion. The present technology is applicable to a mobile terminal provided with a camera and a display unit.

15 Claims, 22 Drawing Sheets

FIG. 20

```
1:   accX = (currentAccX * factor) + (previousAccX * (1.0 – factor));
2:   accY = (currentAccY * factor) + (previousAccY * (1.0 – factor));
3:   accZ = (currentAccZ * factor) + (previousAccZ * (1.0 – factor));

4:   diffX = accX – previousAccX;
5:   diffY = accY – previousAccY;
6:   diffZ = accZ – previousAccZ;

7:   previsouAccX = diffX;
8:   previsouAccY = diffY;
9:   previsouAccZ = diffZ;

10:  deltaX = diffX * weight;   // weight = –650
11:  deltaY = diffY * weight;
12:  deltaZ = diffZ * weight;

13:  if (deltaX * deltaX + deltaY * deltaY + deltaZ * deltaZ < 40.0) {
14:    focus.fadeOut();
15:  } else {
16:    foucs.fadeIn();
17:  }
```

FIG. 21

```
1:   foucus. animateFocusWithDelta (deltaX, deltaY, deltaZ)  {
2:       moveFocusA (deltaX, deltaY);
3:       resizeFocusA (deltaZ);
4:       moveFocusB (deltaX, deltaY);
5:       resizeFocusB (deltaZ);
6:       moveFocusC (deltaX, deltaY);
7:       resizeFocusC (deltaZ);
8:       moveFocusD (deltaX, deltaY);
9:   }
10:  moveFocusA (deltaX, deltaY) {
11:    x = 160.0 + deltaX * 1.4;
12:    y = 213.0 + deltaY * 1.4;
13:    focusA. moveTo (x, y);
14:  }
15:  resizeFocusA (deltaZ) {
16:      focusA resizeTo (1.4 * f(deltaZ));
17:  }
18:  moveFocusB (deltaX, deltaY) {
19:    x = 160.0 + deltaX * 1.0;
20:    y = 213.0 + deltaY * 1.0;
21:    focusB. moveTo (x, y);
22:  }
23:   resizeFocusB (deltaZ) {
24:      focusB. resizeTo (1.0 * f(deltaZ));
25:  }
26:  moveFocusC (deltaX, deltaY) {
27:    x = 160.0 + deltaX * 0.6;
28:    y = 213.0 + deltaY * 0.6;
29:    focusC. moveTo (x, y);
30:  }
31:   resizeFocusC (deltaZ) {
32:      focusC. resizeTo (0.6 * f(deltaZ));
33:  }
34:  moveFocusD (deltaX, deltaY) {
35:    x = 160.0 - deltaX * 0.4;
36:    y = 213.0 - deltaY * 0.4;
37:    focusD. moveTo (x, y);
38:  }
```

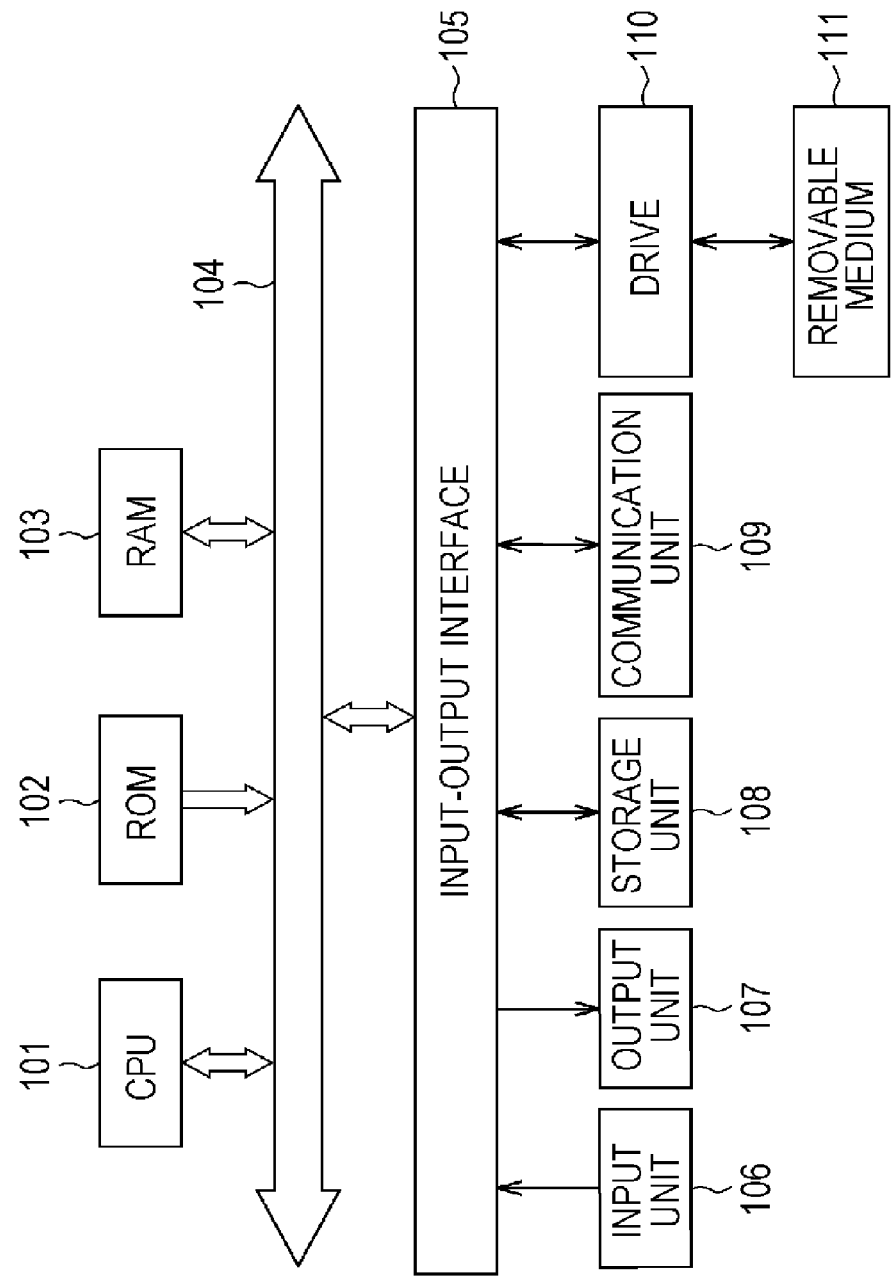

INFORMATION PROCESSING TERMINAL, INFORMATION PROCESSING METHOD, AND PROGRAM

TECHNICAL FIELD

The present technology relates to information processing terminals, information processing methods, and programs and, more particularly, to an information processing terminal, an information processing method, and a program capable of naturally suppressing camera shake with a target object being arranged at a certain position on an image.

BACKGROUND ART

Many digital still cameras have a hand shake alert function installed therein. The hand shake alert function is to detect hand shake of a user and display an alert if the hand shake is too large to cause motion blur of an object.

The hand shake alert is put out, for example, in a mode in which an icon is displayed while the user is watching a captured image to determine the composition. The hand shake alert icon is displayed at a certain position, such as a corner, of the captured image along with an indicator or a numerical value indicating the amount of camera shake.

CITATION LIST

Patent Literature

PTL 1: Japanese Unexamined Patent Application Publication No. 2008-22300

SUMMARY OF INVENTION

Technical Problem

With the hand shake alert described above, it is necessary for the user to take his/her eyes from an object on the captured image in order to confirm the amount of camera shake and, thus, it is difficult for the user to confirm the amount of camera shake while determining the composition.

In addition, only the amount of camera shake can be confirmed from the icon and the user is not capable of determining which direction the user moves his/her hands to suppress the camera shake.

The present technology is provided under such situations in order to naturally suppress the camera shake, for example, with a target object being arranged at a certain position on an image.

Solution to Problem

An information processing terminal of an aspect of the present technology includes an imaging unit that takes an image; a display unit that displays the taken image; a measuring unit that measures a motion occurring in the terminal itself; and a display control unit that displays an indicator composed of a plurality of components arranged in a nested structure on the image and varies a position and a size of each component in accordance with the motion.

The display control unit may be caused to vary the positions of the components in accordance with the motion in the directions of two axes that are defined on a face of the display unit and that are orthogonal to each other and to vary the sizes of the components in accordance with the motion in the direction of an axis orthogonal to the two axes.

The display control unit may be caused to move at least one of the plurality of components in a direction opposite to the direction of the motion.

The display control unit may be caused to move the inner components by an amount larger than that of the outer components.

The display control unit may be caused to move the outermost component, among the plurality of components, in the same direction as the direction of the motion.

The respective components may be arranged such that the center positions of the components coincide with each other when no motion occurs. In this case, the display control unit may be caused to vary the positions of the respective components with respect to the center position.

The display control unit may be caused to vary at least one of the plurality of components so as to be decreased in size if the motion in a user direction along the axis orthogonal to the two axes is measured and so as to be increased in size if the motion in a direction opposite to the user direction is measured.

When the motion in the user direction is measured, the display control unit may be caused to make the amounts of variation of the outer components larger than the amounts of variation of the inner components to vary the components so as to be decreased in size.

When the motion in the direction opposite to the user direction is measured, the display control unit may be caused to make the amounts of variation of the inner components larger than the amounts of variation of the outer components to vary the components so as to be increased in size.

The display control unit may be caused to fix the size of the outermost component, among the plurality of components.

When no motion occurs, the respective components may be arranged such that the outer components and the inner components are spaced at regular intervals. In this case, the display control unit may be caused to vary the sizes of the respective components with respect to the sizes when the outer components and the inner components are spaced at regular intervals.

When no motion occurs, the respective components may be arranged so as to have the same size. In this case, the display control unit may be caused to vary the sizes of the respective components with respect to the same size.

When the motion is not measured, the display control unit may be caused to perform a process of clearing the display of the indicator.

In an aspect of the present technology, an image is taken, the taken image is displayed, and a motion occurring in the terminal itself is measured. In addition, a process is performed in which an indicator composed of a plurality of components arranged in a nested structure is displayed on the image and a position and a size of each component are varied in accordance with the motion.

Advantageous Effects of Invention

According to the present technology, it is possible to naturally suppress camera shake, for example, with a target object being arranged at a certain position on an image.

BRIEF DESCRIPTION OF DRAWINGS

FIG. 20 is a diagram for describing a specific example of the process.

FIG. 21 is another diagram for describing the specific example of the process.

FIG. 22 is a block diagram showing an example of the configuration of a computer.

DESCRIPTION OF EMBODIMENTS

<External Configuration of Information Processing Terminal>

Figure 1:
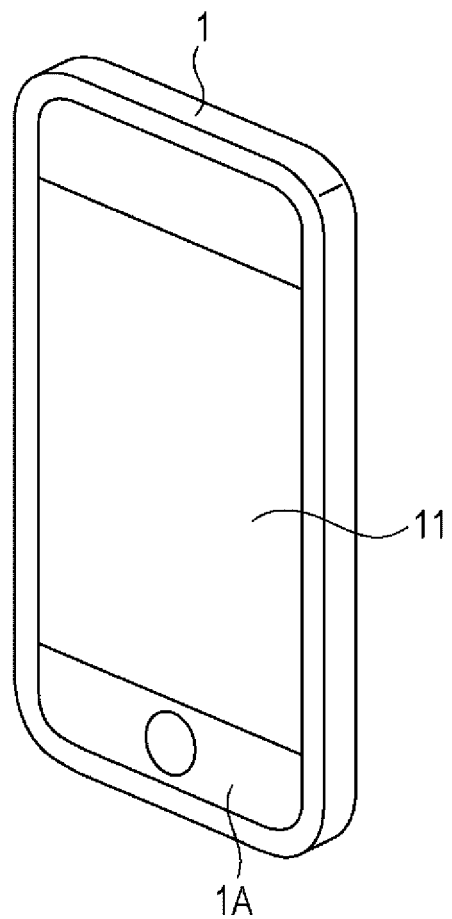
FIG. 1 is a diagram showing an example of the configuration of a front face of an information processing terminal.

FIG. 1 is a diagram showing an example of the external view of an information processing terminal according to an embodiment of the present technology.

An information processing terminal 1 is a mobile terminal, such as a so-called smartphone, having a casing of a size which a user is capable of carrying with one hand. A display unit 11 composed of, for example, a liquid crystal display (LCD) is provided on a front face 1A of the casing of the information processing terminal 1. A layered touch panel is provided in the display unit 11 and the user is capable of performing various operations by directly touching, for example, a button displayed on the display unit 11 with his/her finger.

Figure 2:
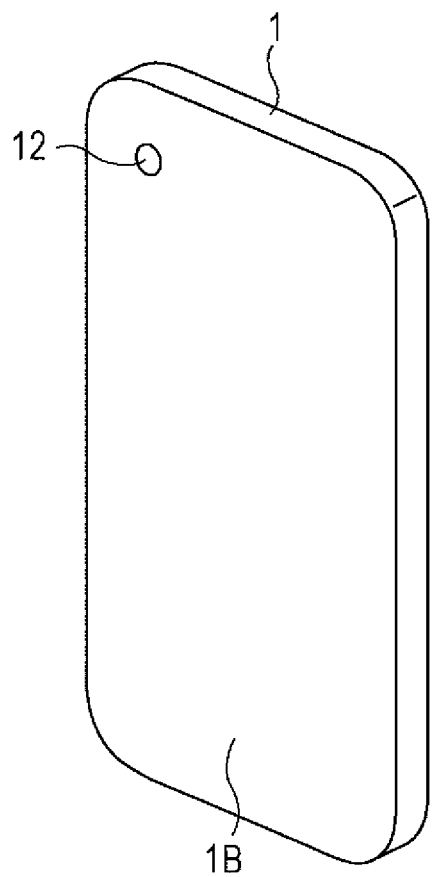
FIG. 2 is a diagram showing an example of the configuration of a rear face of the information processing terminal.

A camera 12 is provided in a rear face 1B of the casing of the information processing terminal 1, as shown in FIG. 2. An image (captured image) captured by the camera 12 is displayed in real time in the display unit 11.

A user interface (UI) function is installed in the information processing terminal 1 having the above external configuration. An indicator for allowing camera shake to be suppressed with a target object being arranged at a certain position, such as the center of a screen, is displayed with the UI function. The target object is selected from various objects including the face of a person, a building, and a two-dimensional maker, an image of which the user is to take.

As described below, the display of the indicator is varied with the direction and the magnitude of a motion occurring in the information processing terminal 1 due to the camera shake or the like. The motion occurring in the information processing terminal 1 is represented by, for example, an acceleration measured by an acceleration sensor incorporated in the information processing terminal 1.

Figure 3:
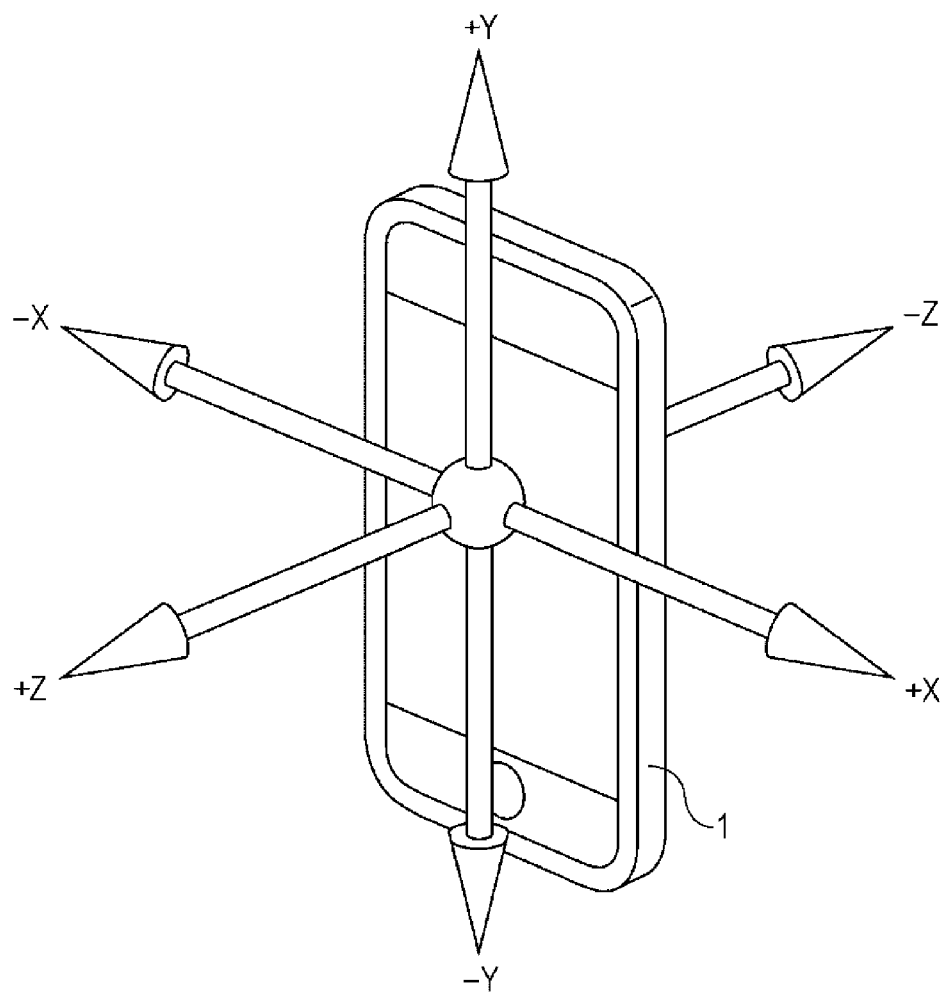
FIG. 3 is a diagram for describing measurement directions of acceleration.

FIG. 3 is a diagram for describing measurement directions of the acceleration. The accelerations in an X-axis direction, a Y-axis direction, and a Z-axis direction shown in FIG. 3 are detected in the information processing terminal 1.

The X axis is an axis in a direction that passes through the center of the display unit 11 and that is orthogonal to the longitudinal direction of the casing. The Y axis is an axis that passes through the center of the display unit 11 and that is parallel to the longitudinal direction of the casing. The X axis and the Y axis are axes that are defined on the face of the display unit 11 and that are orthogonal to each other. The Z axis is an axis that is orthogonal to the two axes of the X axis and the Y axis and that passes through the center of the display unit 11.

The right direction toward the display unit 11 is a +X direction, the left direction toward the display unit 11 is a −X direction, the upper direction toward the display unit 11 is a +Y direction, and the lower direction toward the display unit 11 is a −Y direction. The direction from the rear face 1B side toward the front face 1A side is a +Z direction and the direction from the front face 1A side toward the rear face 1B side is a −Z direction. The +Z direction with respect to the information processing terminal 1 is the direction where the user is located.

<Example of Display of Screen>

The display of the indicator is premised on the following two mentalities of persons.

1. Persons normally adjust the imaging range of the camera 12 so that a target object is arranged at the center of a captured image when they point the camera 12 at the target object. In particular, this point stands out when the target object is a two-dimensional marker or the like in order to cause the information processing terminal 1 to recognize the two-dimensional marker.

2. Persons attempt to correct distortion if the indicator is displayed in the distorted manner.

Figure 4:
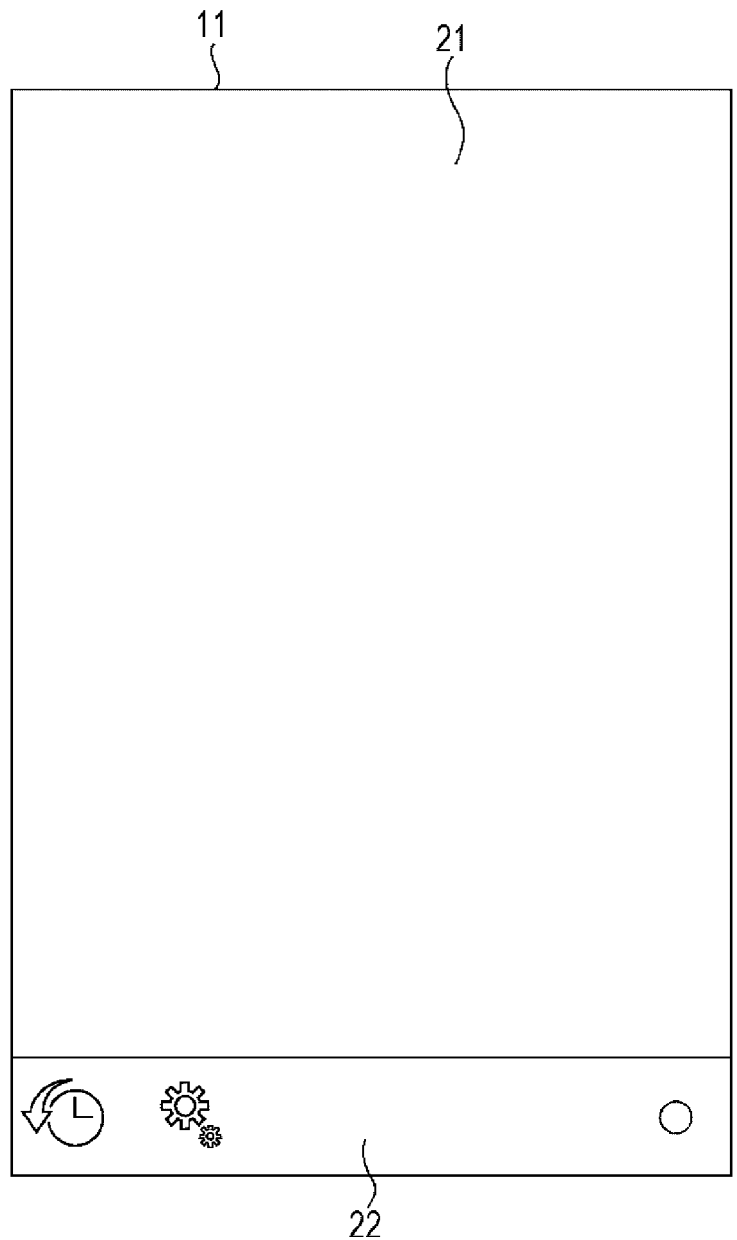
FIG. 4 is a diagram showing an example of the structure of a screen of a display unit.

FIG. 4 is a diagram showing an example of the structure of a screen displayed in the display unit 11 when the camera 12 is used in the imaging.

The screen in FIG. 4 is displayed instead of a menu screen, for example, when activation of a camera application, which is an application having the imaging function, is instructed on the menu screen displayed in the display unit 11.

As shown in FIG. 4, the screen of the camera application includes an image display area 21 and an icon display area 22. The image display area 21, which is formed in substantially the entire display unit 11, is an area where a captured image captured by the camera 12 is displayed. The icon display area 22, which is a band-shaped area formed along the lower side of the display unit 11, is an area where various icons are displayed in a line.

After the camera application is activated, the user watches the captured image displayed in the image display area 21 to adjust the imaging range. The captured image is not shown in FIG. 4. The same applies to the other drawings showing examples of display of screens.

When an acceleration higher than or equal to a certain value is detected, for example, during the adjustment of the imaging range, the indicator is displayed on the captured image in the image display area 21.

Figure 5:
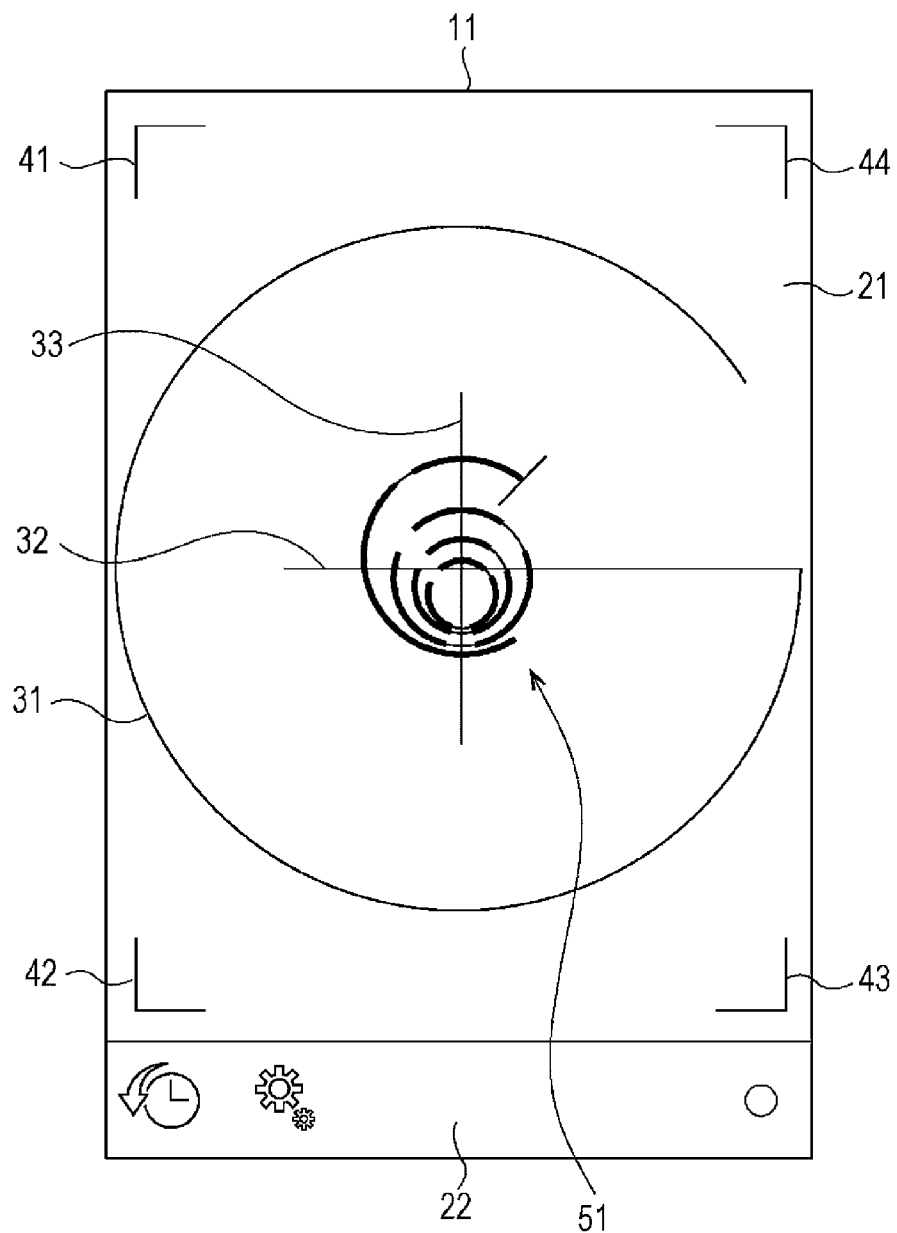
FIG. 5 is a diagram showing an example of how an indicator is displayed.

FIG. 5 is a diagram showing an example of how the indicator is displayed.

As shown in FIG. 5, a circle 31 is displayed in the image display area 21. The center position of the circle 31 is at the center of the image display area 21 and the circle 31 has a substantially full circular shape with a radius of a length slightly shorter than the distance between the center of the image display area 21 and the long sides thereof. Part of the right side of the circle 31 is cut out. A horizontal line 32 that horizontally extends from an end of a curved line forming the circle 31 intersects with a vertical line 33 that is orthogonal to the horizontal line 32 at the center of the image display area 21.

The circle 31, the horizontal line 32, and the vertical line 33 are fixedly displayed. The user is capable of adjusting the imaging range of the camera 12 so that a target object is arranged at the center of the image display area 21 with respect to the circle 31, the horizontal line 32, and the vertical line 33.

L-shaped guides 41 to 44 the interior angles of which are toward the center of the image display area 21 are displayed at an upper left corner, a lower left corner, a lower right corner, and an upper right corner, respectively, of the image display area 21. While a certain acceleration is detected and the indicator is displayed, the guides 41 to 44 are fixedly displayed at the four corners of the image display area 21. When no acceleration is detected because, for example, the camera shake is corrected, the guides 41 to 44 are moved and displayed so as to converge at the center of the image display area 21 and disappear along with the indicator 51.

An indicator 51 is displayed near the center of the image display area 21. The indicator 51 disappears when no acceleration is detected because, for example, the camera shake is corrected.

Figure 6:
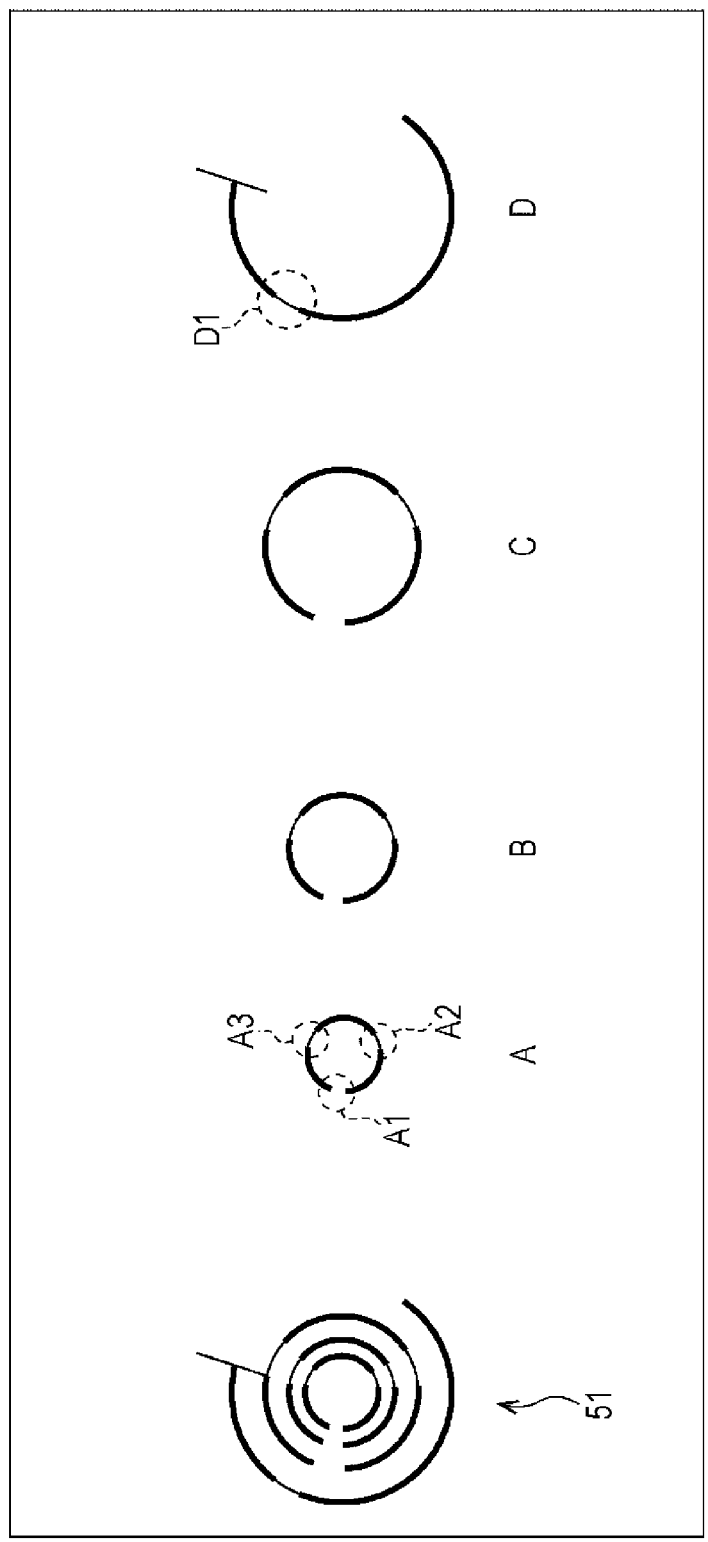
FIG. 6 is a diagram showing a structure of the indicator.

FIG. 6 is a diagram showing an example of the structure of the indicator 51.

The indicator 51 has four rings: a ring A, a ring B, a ring C, and a ring D having different sizes as the components. The indicator 51 is composed of the four rings: the ring A, the ring B, the ring C, and the ring D that are arranged in ascending order of size in a nested structure.

The ring A has a substantially circular shape but the arc of the ring A is cut out at a position A1, which is a position on the circumference composing the ring A. Thin-line arcs are drawn at positions A2 and A3, which are also positions on the circumference, so as to connect thick-line arcs sandwiching the positions A2 and A3. The positions A1, A2, and A3 are spaced at regular intervals. The shapes of the rings B and C are similar to the shape of the ring A.

The ring D has an arc shape of a length of about ¾ of the full circle. A thin-line arc is drawn at a position D1, which is a position on the circumference composing the ring D, so as to connect thick-line arcs sandwiching the position D1.

The default positions (the positions when no acceleration is detected) of the rings A to D are positions arranged in a concentric manner, as shown on the left side in FIG. 6. The center positions of the rings A to D coincide with each other at the default positions. In addition, in the default sizes of the rings A to D arranged in a concentric circle, the spaces between the ring D and the ring C, between the ring C and the ring B, and between the ring B and the ring A, that is, the spaces between the outer rings and the inner rings are substantially equal to each other.

Furthermore, the shapes of the rings A to D are not limited to the ones shown in FIG. 6 and each ring may be composed of a simple circle. The rings A to D are hereinafter appropriately shown as simple circles.

Figure 7:
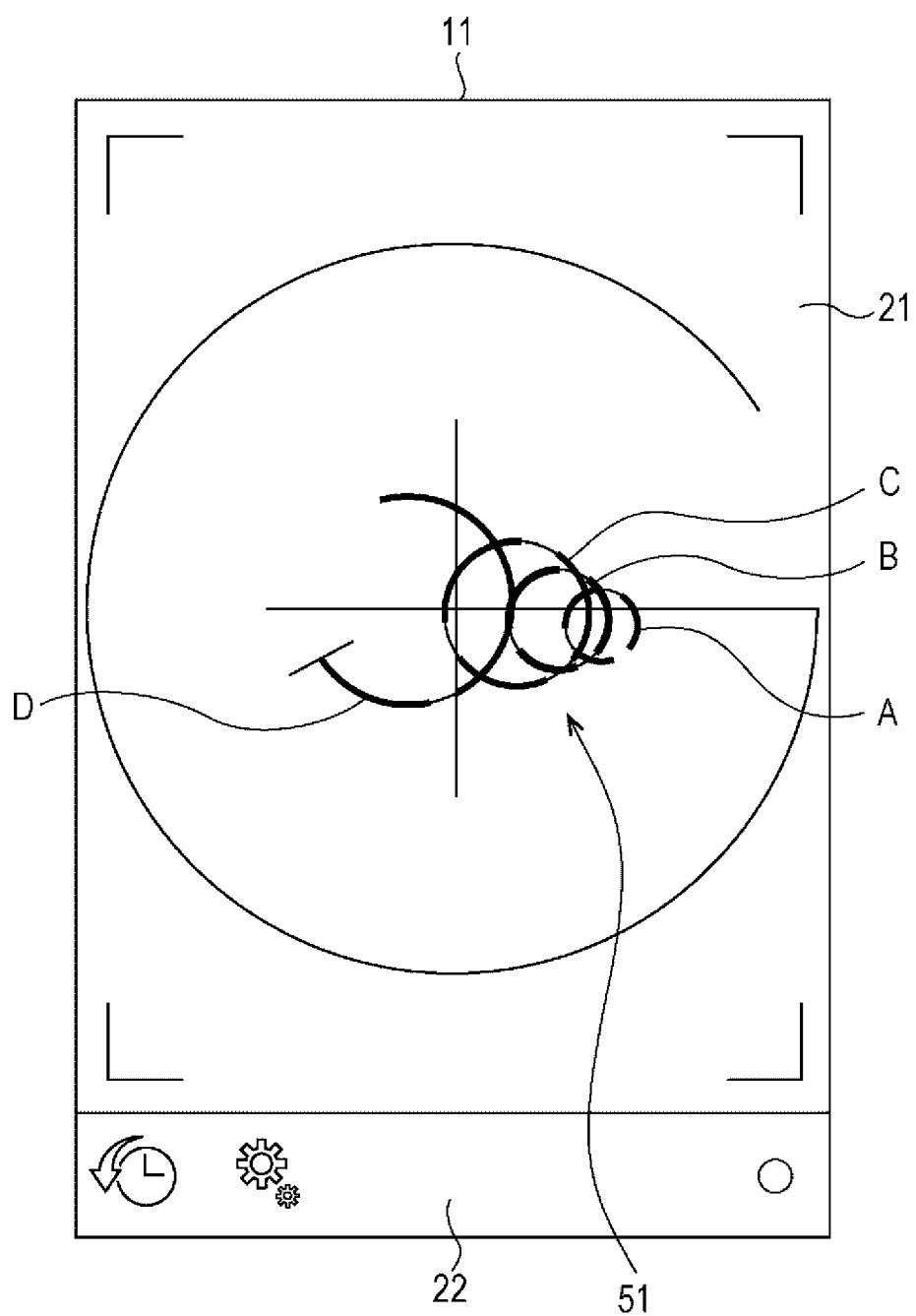
FIG. 7 is a diagram showing another example of how the indicator is displayed.

The positions and the sizes of the rings A to D having the above shapes are separately varied with the magnitude and the direction of the acceleration detected by the acceleration sensor, as in a manner shown in FIG. 7.

In the example in FIG. 7, the ring D slightly moves leftward and the ring C slightly moves rightward with respect to the center of the image display area 21. The ring B further moves rightward, compared with the ring C, and the ring A further moves rightward, compared with the ring B. In addition, the ring D is kept at the same size as that in FIG. 5. The rings A to C are slightly increased in size, compared with the sizes thereof in FIG. 5.

When the indicator 51 is displayed in the manner shown in FIG. 7, the user has the mentality to slightly move the ring D rightward and move the rings A, B, and C leftward to return the rings A to D to the concentric positions. The user also has the mentality to return the sizes of the rings A, B, and C to the default sizes. Adjusting the imaging range of the camera 12 in accordance with these mentalities leads to arrangement of the target object at the center of the image display area 21 and attempt to suppression of the camera shake.

<Example of Variation of Indicator>

Figure 8:
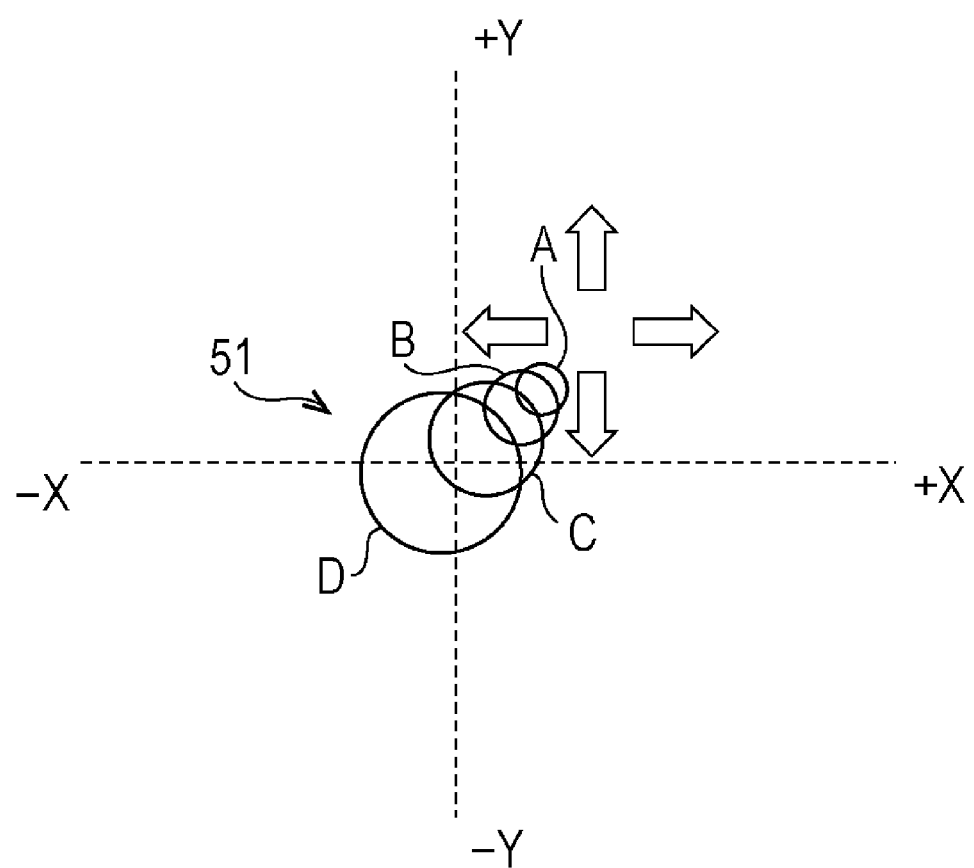
FIG. 8 is a diagram showing an example of how the indicator is varied.

FIG. 8 is a diagram for describing how the indicator 51 is varied when an acceleration in at least one of the X-axis direction and the Y-axis direction is detected. The intersection between the X axis and the Y axis in FIG. 8 is positioned at the center position of the image display area 21.

When an acceleration in at least one of the X-axis direction and the Y-axis direction is detected, the rings A to C moves in a direction opposite to the acceleration direction without changing the sizes (while keeping the default sizes). As for the amounts of movement of the rings A to C, the amounts of movement of the inner smaller rings are larger than the amounts of movement of the outer larger rings. The ring A moves by an amount larger than that of the ring B and the ring B moves by an amount larger than that of the ring C. The outermost ring D moves a bit in the same direction as the acceleration direction without changing the size.

The above movement creates an image of a motion of a spring that exists such that the upper face of the spring coincides with the face of the display unit 11 when the upper face of the spring is fixed with slight ranges of motion in the X and Y directions and the opposite face (the lower face) of the spring is pulled in a direction opposite to the direction in which the acceleration occurs. The ring A corresponding to the lower face of the spring moves by the largest amount in the direction opposite to the direction in which the acceleration occurs and the ring D corresponding to the upper face of the spring slightly moves in the direction in which the acceleration occurs. In addition, the rings B and C correspond to intermediate faces of the spring, viewed from the longitudinal direction. The ring B closer to the lower face moves by an amount larger than that of the ring C and the rings B and C move in the direction opposite to the direction in which the acceleration occurs.

The indicator 51 in FIG. 8 indicates a state when accelerations in the −X direction and the −Y direction are detected.

Figure 9:
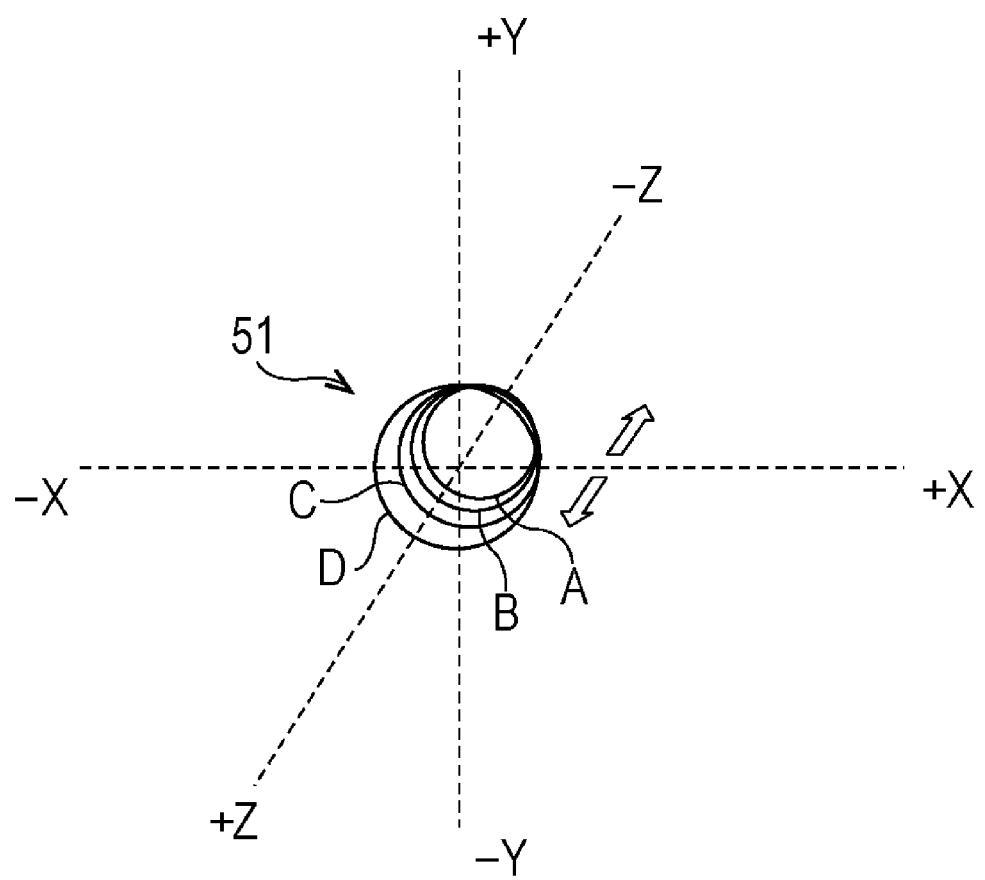
FIG. 9 is a diagram showing another example of how the indicator is varied.

FIG. 9 is a diagram for describing how the indicator 51 is varied when an acceleration in the Z-axis direction is detected. The intersection between the X axis, the Y axis, and the Z axis in FIG. 9 is positioned at the center position of the image display area 21.

When an acceleration in the Z-axis direction is detected, the rings A to C are increased in size if the acceleration direction is the −Z direction and are decreased in size if the acceleration direction is the +Z direction without changing the positions (while keeping the default positions). As for the amounts of variation in size of the rings A to C when an acceleration in the −Z direction is detected, the amounts of variation in size of the inner smaller rings are larger than the amounts of variation in size of the outer larger rings. In this example, the inner rings are not made larger than the outer rings although the amounts of variation of the inner rings are larger than the amounts of variation of the outer rings. The position and the size of the ring D are fixed to the default position and size. The size of the ring D may be slightly varied.

The above variation in size creates an image of a motion of a spring that exists such that the upper face of the spring coincides with the face of the display unit 11 when the upper face of the spring is fixed with slight ranges of motion in the X and Y directions and the opposite face of the spring is pushed toward the upper face side if the acceleration direction is the −Z direction and is pulled if the acceleration direction is the +Z direction.

The indicator 51 in FIG. 9 indicates a state when an acceleration in the −Z direction is detected.

How the indicator 51 is varied when an acceleration occurs in each of the X-axis, the Y-axis, and the Z-axis directions will be further described.

Figure 10:
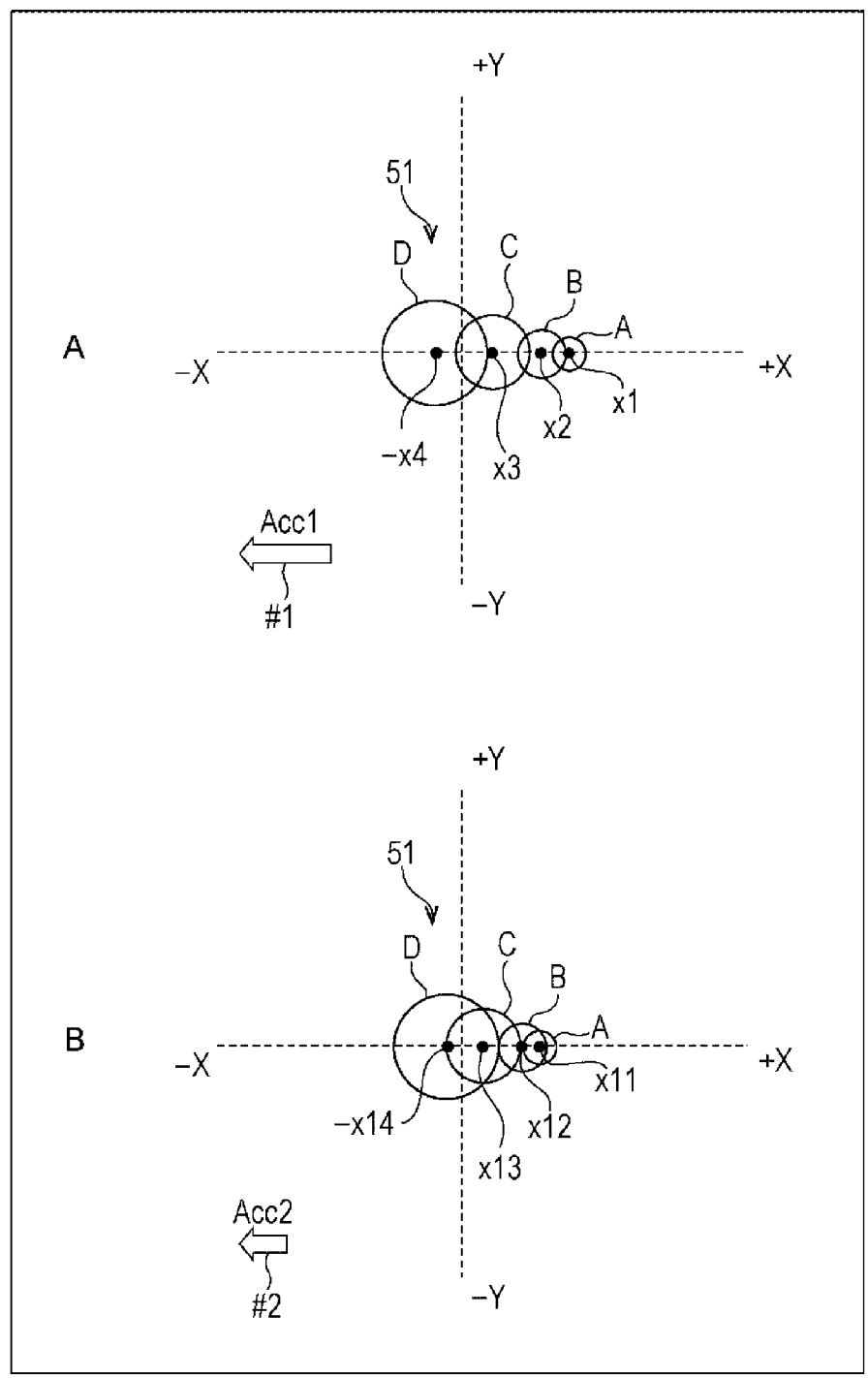
FIG. 10 includes diagrams showing examples of how the indicator is varied when accelerations in an X-axis direction are detected.

FIGS. 10A and 10B are diagrams showing examples of how the indicator is varied when accelerations in the X-axis direction are detected.

The indicator 51 in FIG. 10A indicates a state when an acceleration Acc1 in the −X direction is detected, as shown by a void arrow #1.

In this case, the center position of the ring A moves to a position represented by x1 in the +X direction, which is a direction opposite to the direction in which the acceleration Acc1 is detected. The center position of the ring B moves to a position represented by x2 in the +X direction, and the center position of the ring C moves to a position represented by x3 in the +X direction. A relationship x1>x2>x3 is established between x1, x2, and x3. Since no acceleration is detected in the Z-axis direction, the sizes of the rings A to C are not varied.

In addition, the center position of the ring D moves to a position represented by −x4 in the −X direction, which is the same direction as that in which the acceleration Acc1 is detected.

The indicator 51 in FIG. 10B indicates a state when an acceleration Acc2 in the −X direction is detected, as shown by a void arrow #2. The acceleration Acc2 is smaller than the acceleration Acc1.

In this case, the center position of the ring A moves to a position represented by x11 in the +X direction, which is a direction opposite to the direction in which the acceleration Acc2 is detected. The center position of the ring B moves to a position represented by x12 in the +X direction, and the center position of the ring C moves to a position represented by x13 in the +X direction. A relationship x11>x12>x13 is established between x11, x12, and x13, and relationships x11<x1 (FIG. 10A), x12<x2, and x13<x3 are established. Since no acceleration is detected in the Z-axis direction, the sizes of the rings A to C are not varied.

In addition, the center position of the ring D moves to a position represented by −x14 in the −X direction, which is the same direction as that in which the acceleration Acc2 is detected. A relationship |−x14|<|−x4| is established for x14.

FIG. 10A and FIG. 10B show that the indicator 51 is more extended overall in the X-axis direction when the higher acceleration is detected.

Figure 11:
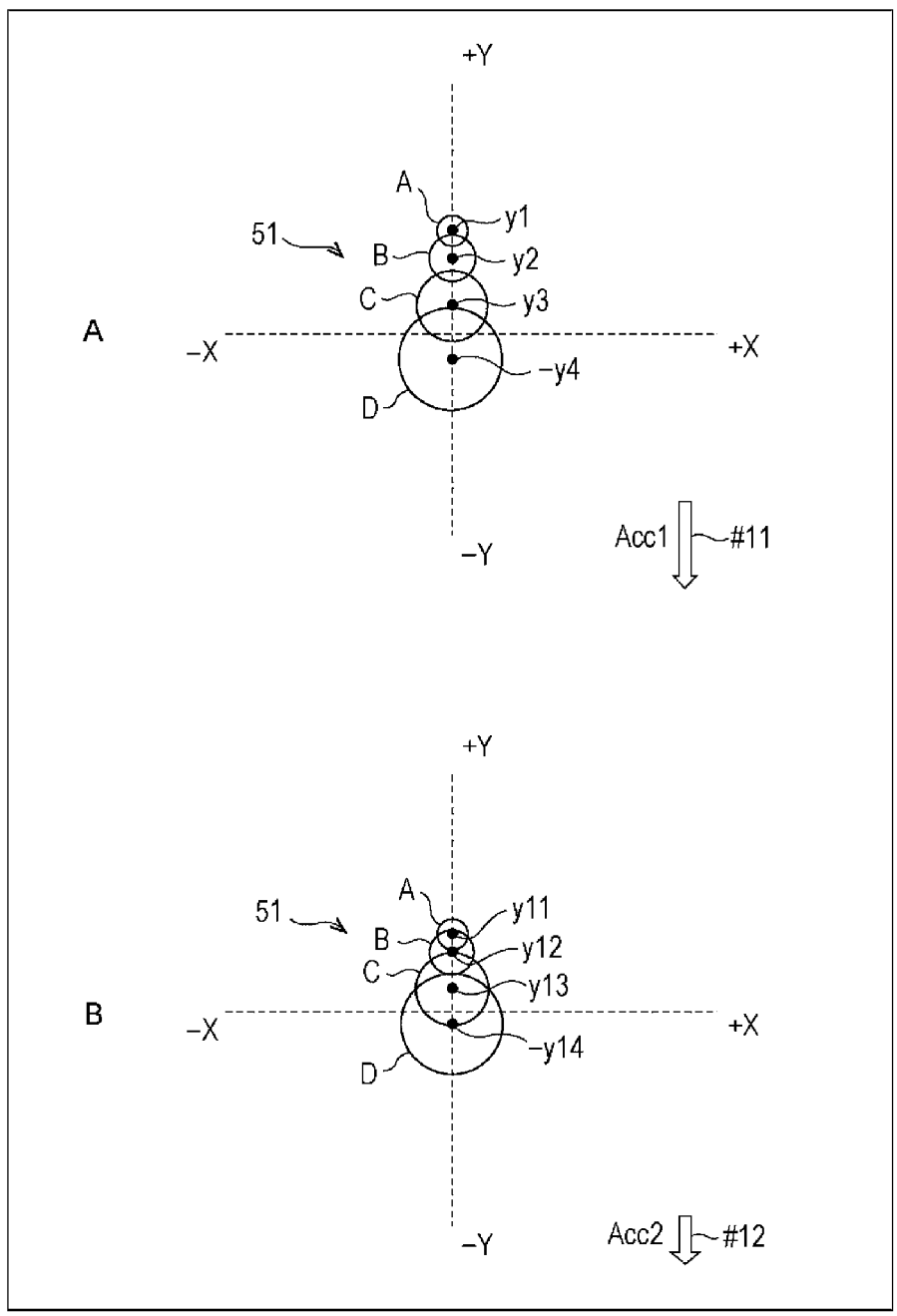
FIG. 11 includes diagrams showing examples of how the indicator is varied when accelerations in a Y-axis direction are detected.

FIGS. 11A and 11B are diagrams showing examples of how the indicator is varied when accelerations in the Y-axis direction are detected.

The indicator 51 in FIG. 11A indicates a state when the acceleration Acc1 in the −Y direction is detected, as shown by a void arrow #11.

In this case, the center position of the ring A moves to a position represented by y1 in the +Y direction, which is a direction opposite to the direction in which the acceleration Acc1 is detected. The center position of the ring B moves to a position represented by y2 in the +Y direction, and the center position of the ring C moves to a position represented by y3 in the +Y direction. A relationship y1>y2>y3 is established between y1, y2, and y3. Since no acceleration is detected in the Z-axis direction, the sizes of the rings A to C are not varied.

In addition, the center position of the ring D moves to a position represented by −y4 in the −Y direction, which is the same direction as that in which the acceleration Acc1 is detected.

The indicator 51 in FIG. 11B indicates a state when the acceleration Acc2 in the −Y direction is detected, as shown by a void arrow #12. The acceleration Acc2 is smaller than the acceleration Acc1.

In this case, the center position of the ring A moves to a position represented by y11 in the +Y direction, which is a direction opposite to the direction in which the acceleration Acc2 is detected. The center position of the ring B moves to a position represented by y12 in the +Y direction, and the center position of the ring C moves to a position represented by y13 in the +Y direction. A relationship y11>y12>y13 is established between y11, y12, and y13, and relationships y11<y1 (FIG. 11A), y12<y2, and y13<y3 are established. Since no acceleration is detected in the Z-axis direction, the sizes of the rings A to C are not varied.

In addition, the center position of the ring D moves to a position represented by −y14 in the −Y direction, which is the same direction as that in which the acceleration Acc2 is detected. A relationship |−y14|<|−y4| is established for y14.

FIG. 11A and FIG. 11B show that the indicator 51 is more extended overall in the Y-axis direction when the higher acceleration is detected.

Figure 12:
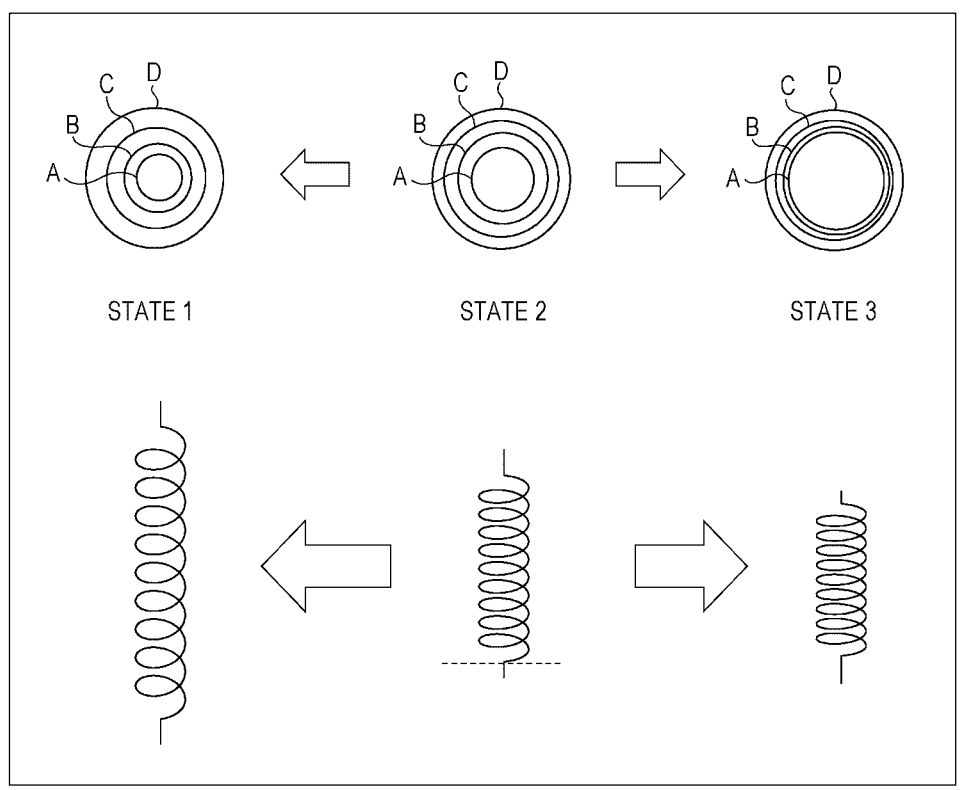
FIG. 12 is a diagram showing an example of how the indicator is varied when an acceleration in a Z-axis direction is detected.

FIG. 12 is a diagram showing a first example of how the indicator is varied when an acceleration in the Z-axis direction is detected. The front side of the sheet of paper corresponds to the +Z direction and the back side of the sheet of paper corresponds to the −Z direction.

A state 2 at the center of an upper row in FIG. 12 shows the default state (stable state) of the indicator 51. The state 2 indicates a state of the indicator 51 in which the rings A to D are arranged in a concentric manner and the inner rings and the outer rings are substantially equally spaced.

When an acceleration in the −Z direction is detected, the rings A to C are increased in size and the state of the indicator 51 is changed to a state 3 shown on the right side. The state 3 indicates a state of the indicator 51 in which the rings A to D are arranged in a concentric manner and the spaces between the rings are narrower than those in the stable state.

Since the amounts of variation in size of the inner smaller rings are larger than those of the outer larger rings when an acceleration in the −Z direction is detected, the space between the ring A and the ring B is narrowest. In addition, the space between the ring B and the ring C is wider than the space between the ring A and the ring B, and the space between the ring C and the ring D is wider than the space between the ring B and the ring C.

The state 3 indicates a state when the spring that is more compressed than the stable state is viewed from the upper face side, as shown on the right side in a lower row in FIG. 12.

In contrast, when an acceleration in the +Z direction is detected, the rings A to C are decreased in size and the state of the indicator 51 is changed to a state 1 shown on the left side. The state 1 indicates a state of the indicator 51 in which the rings A to D are arranged in a concentric manner and the spaces between the rings are wider than those in the stable state.

In this example, the amounts of variation in size of the outer larger rings is larger than those of the inner smaller rings when an acceleration in the +Z direction is detected. The space between the ring A and the ring B is narrowest and the space between the ring B and the ring C is wider than the space between the ring A and the ring B. In addition, the space between the ring C and the ring D is wider than the space between the ring B and the ring C.

The state 1 indicates a state when the spring that is more stretched than the stable state is viewed from the upper face side, as shown on the left side in the lower row in FIG. 12.

Figure 13:
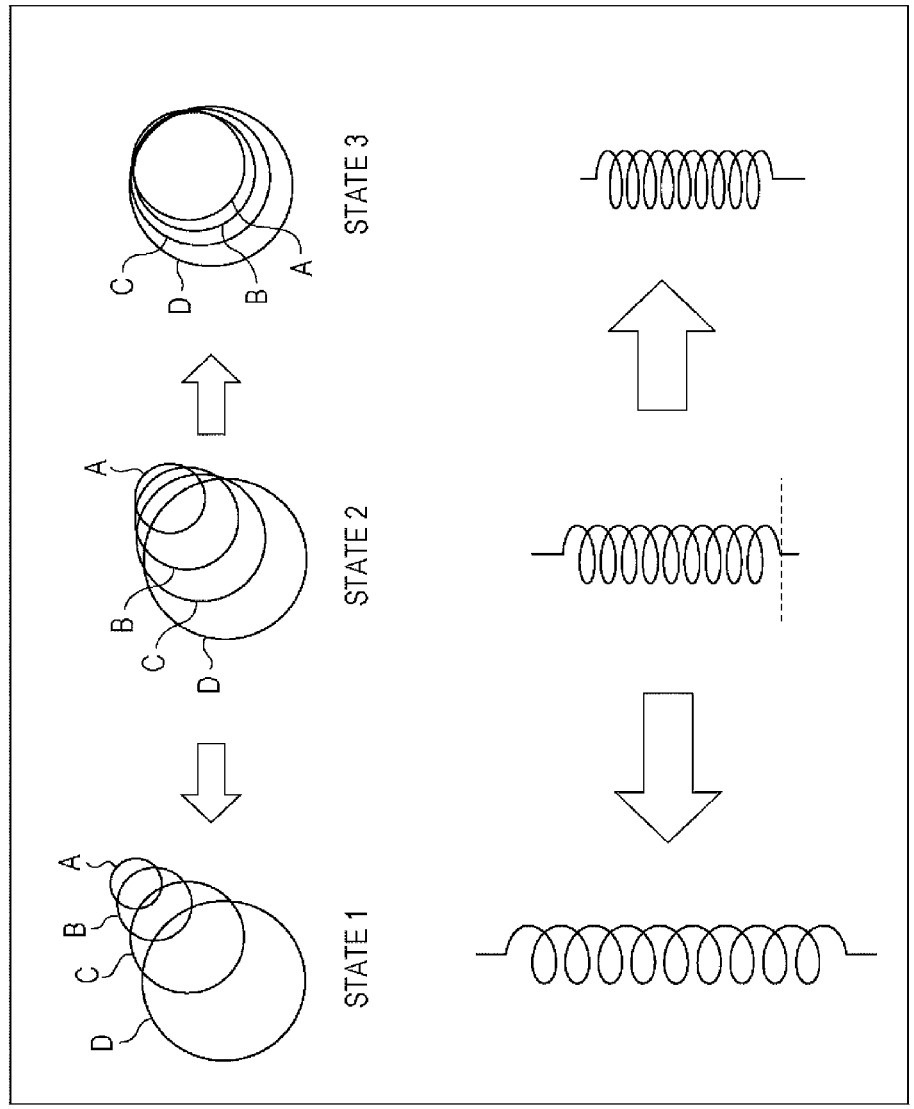
FIG. 13 is a diagram showing another example of how the indicator is varied when an acceleration in the Z-axis direction is detected.

FIG. 13 is a diagram showing an example of how the indicator is varied when accelerations in the X-axis direction and the Y-axis direction are detected, in addition to an acceleration in the Z-axis direction, in the information processing terminal 1 displaying the indicator 51 in the manner in FIG. 12.

A state 2 at the center in an upper row in FIG. 13 shows a state of the indicator 51 when no acceleration in the Z-axis direction is detected although accelerations in the −X direction and the −Y direction are detected. The sizes of the rings A to D are the same as those when the indicator 51 is in the state 2 in FIG. 12. The positions of the rings A to D move in the manners described above with reference to FIG. 10 and FIG. 11.

When accelerations in the −X direction, the −Y direction, and the −Z direction are further detected with respect to the state 2 of the indicator 51, the rings A to C are increased in size in the manner described above with reference to FIG. 12 and the state of the indicator 51 is changed to a state 3 shown on the right side. As described above with reference to FIG. 10 and FIG. 11, the rings A to C move in the +X direction and the +Y direction, which are directions opposite to those in which the accelerations are detected, and the ring D slightly moves in the −X direction and the −Y direction, which are the same directions as those in which the accelerations are detected.

In contrast, when accelerations in the −X direction, the −Y direction, and the +Z direction are detected with respect to the state 2 of the indicator 51, the rings A to C are decreased in size in the manner described above with reference to FIG. 12 and the state of the indicator 51 is changed to a state 1 shown on the left side. The rings A to C move in the +X direction and the +Y direction, which are directions opposite to those in which the accelerations are detected, and the ring D slightly moves in the −X direction and the −Y direction, which are the same directions as those in which the accelerations are detected.

Figure 14:
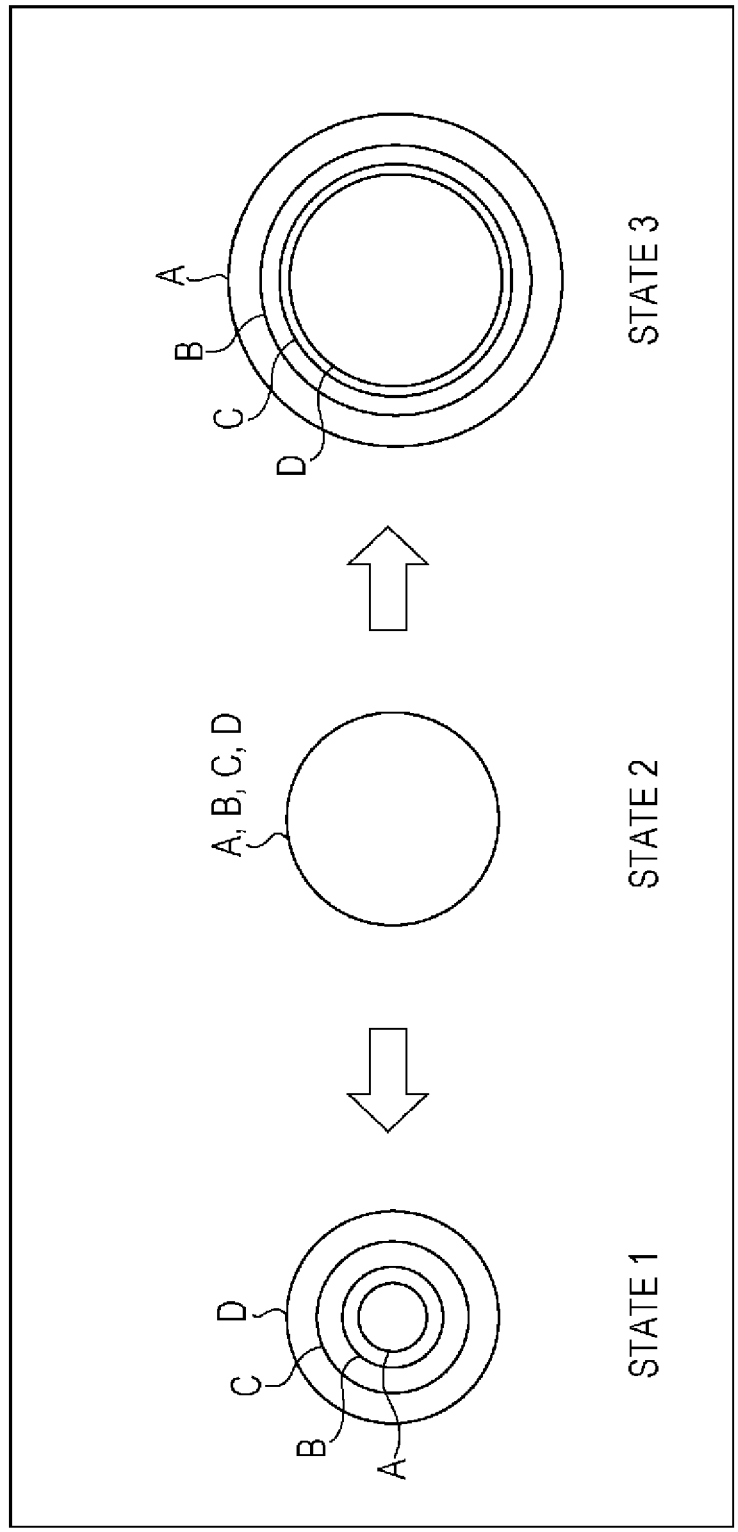
FIG. 14 is a diagram showing another example of how the indicator is varied when an acceleration in the Z-axis direction is detected.

FIG. 14 is a diagram showing a second example of how the indicator is varied when an acceleration in the Z-axis direction is detected.

A state 2 at the center in FIG. 14 shows the default state of the indicator 51. The state 2 indicates a state of the indicator 51 in which the rings A to D of the same size are arranged in a concentric manner to compose one ring.

When an acceleration in the −Z direction is detected, the rings A to C are increased in size and the state of the indicator 51 is changed to a state 3 shown on the right side. The state 3 indicates a state of the indicator 51 in which the rings A to D are arranged in a concentric manner and the rings A to D are arranged such that the spaces between the outer rings and the inner rings are increased toward the outside.

Since the amounts of variation in size of the inner smaller rings are larger than those of the outer larger rings when an acceleration in the −Z direction is detected, the ring A is larger than the ring B, the ring B is larger than the ring C, and the ring C is larger than ring D in this example. The space between the ring A and the ring B is widest. In addition, the space between the ring B and the ring C is narrower than the space between the ring A and the ring B, and the space between the ring C and the ring D is narrower than the space between the ring B and the ring C.

In contrast, when an acceleration in the +Z direction is detected, the rings A to C are decreased in size and the state of the indicator 51 is changed to a state 1 shown on the left side. The state 1 indicates a state of the indicator 51 in which the rings A to D are arranged in a concentric manner and the rings A to D are arranged such that the spaces between the outer rings and the inner rings are decreased toward the inside. The state 1 in FIG. 14 is the same as the state 1 in FIG. 12.

As described above, the respective rings composing the indicator 51 may have the same default sizes.

In addition, the amounts of variation in size of the respective rings may be varied with the direction of the acceleration, for example, the amounts of variation in size of the respective rings when an acceleration in the +Z direction is detected is varied from those when an acceleration in the −Z direction is detected, or may be varied with the magnitude of the acceleration.

Figure 15:
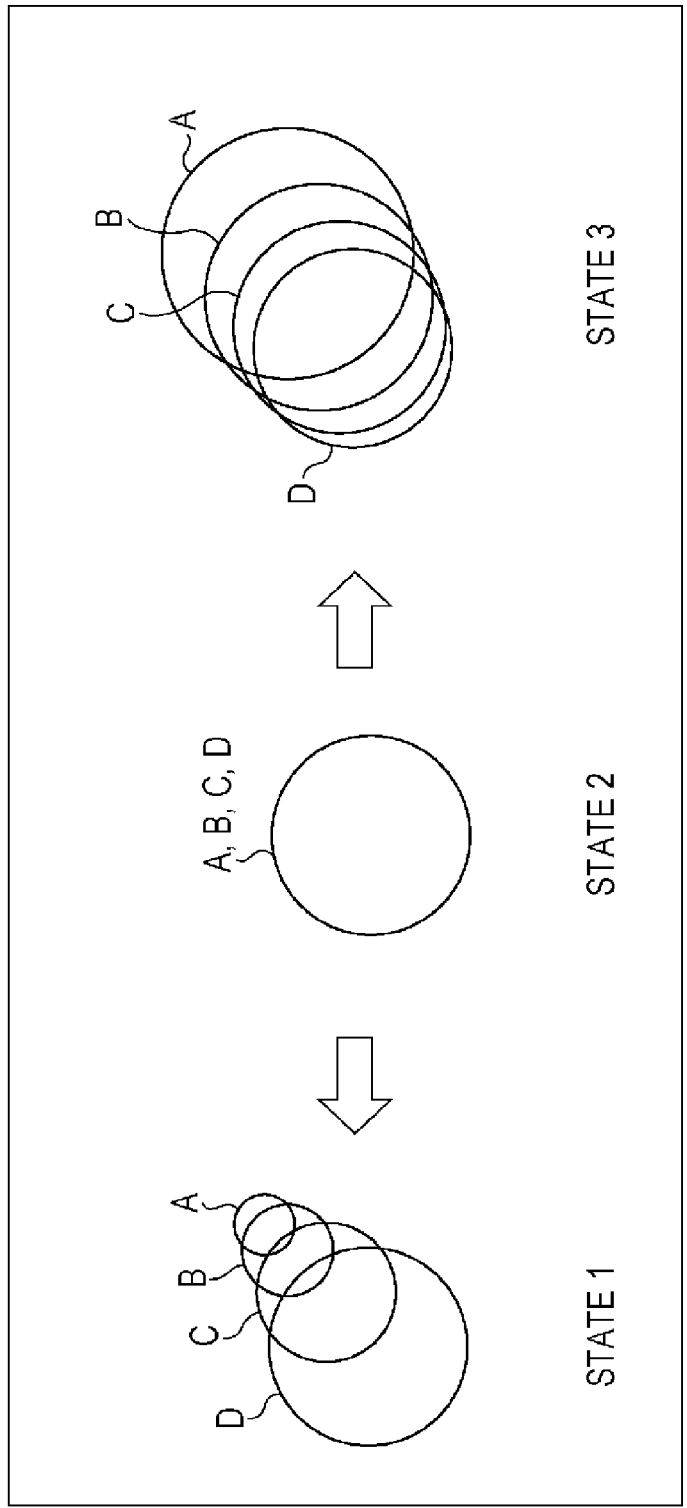
FIG. 15 is a diagram showing an example of how the indicator is varied when an acceleration in the Z-axis direction is detected.

FIG. 15 is a diagram showing an example of how the indicator is varied when accelerations in the X-axis direction and the Y-axis direction are detected, in addition to an acceleration in the Z-axis direction, in the information processing terminal 1 displaying the indicator 51 in the manner in FIG. 14.

A state 2 at the center in an upper row in FIG. 15 shows the default state of the indicator 51.

When accelerations in the −X direction, the −Y direction, and the −Z direction are detected with respect to the state 2 of the indicator 51, the rings A to C are increased in size in the manner described above with reference to FIG. 14 and the state of the indicator 51 is changed to a state 3 shown on the right side. As described above with reference to FIG. 10 and FIG. 11, the rings A to C move in the +X direction and the +Y direction, which are directions opposite to those in which the accelerations are detected, and the ring D slightly moves in the −X direction and the −Y direction, which are the same directions as those in which the accelerations are detected.

In contrast, when accelerations in the −X direction, the −Y direction, and the +Z direction are detected with respect to the state 2 of the indicator 51, the rings A to C are decreased in size in the manner described above with reference to FIG. 14 and the state of the indicator 51 is changed to a state 1 shown on the left side. The rings A to C move in the +X direction and the +Y direction, which are directions opposite to those in which the accelerations are detected, and the ring D slightly moves in the −X direction and the −Y direction, which are the same directions as those in which the accelerations are detected.

A process performed by the information processing terminal 1 controlling the display of the indicator 51 in the above manner will be described below with reference to a flow chart.

<Example of Configuration of Information Processing Terminal 1>

Figure 16:
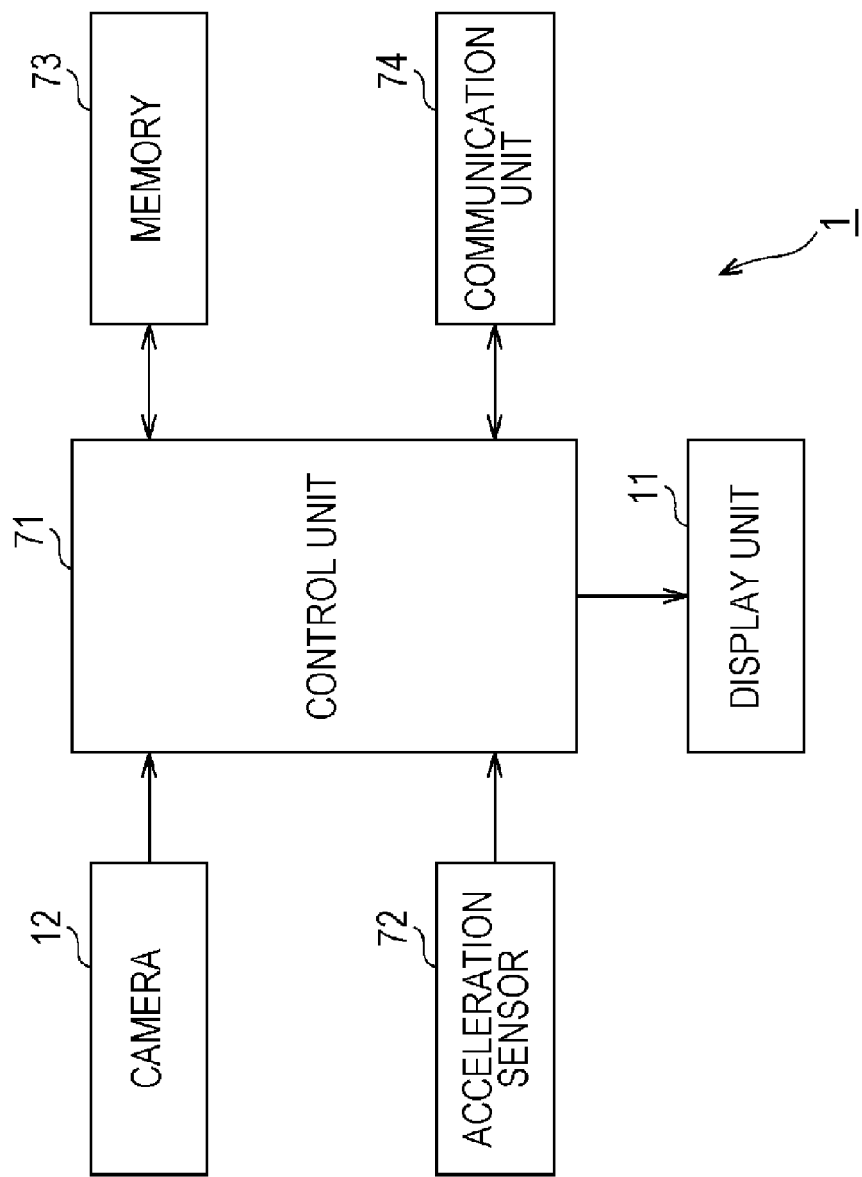
FIG. 16 is a diagram showing an example of the hardware configuration of the information processing terminal.

FIG. 16 is a diagram showing an example of the hardware configuration of the information processing terminal 1.

The information processing terminal 1 includes the display unit 11, the camera 12, a control unit 71, an acceleration sensor 72, a memory 73, and a communication unit 74.

The control unit 71 executes programs stored in, for example, the memory 73 to control the operation of the entire information processing terminal 1. For example, when an acceleration higher than or equal to a threshold value is measured by the acceleration sensor 72, the control unit 71 displays the indicator 51 on a captured image displayed in the display unit 11 and controls the display of the indicator 51 in the manner described above.

The acceleration sensor 72 measures accelerations occurring in the X-axis direction, the Y-axis direction, and the X-axis direction and outputs sensor data indicating the measured values to the control unit 71.

The memory 73 is, for example, a flash memory and stores the programs executed by the control unit 71. The communication unit 74 communicates with an external apparatus under the control of the control unit 71.

Figure 17:
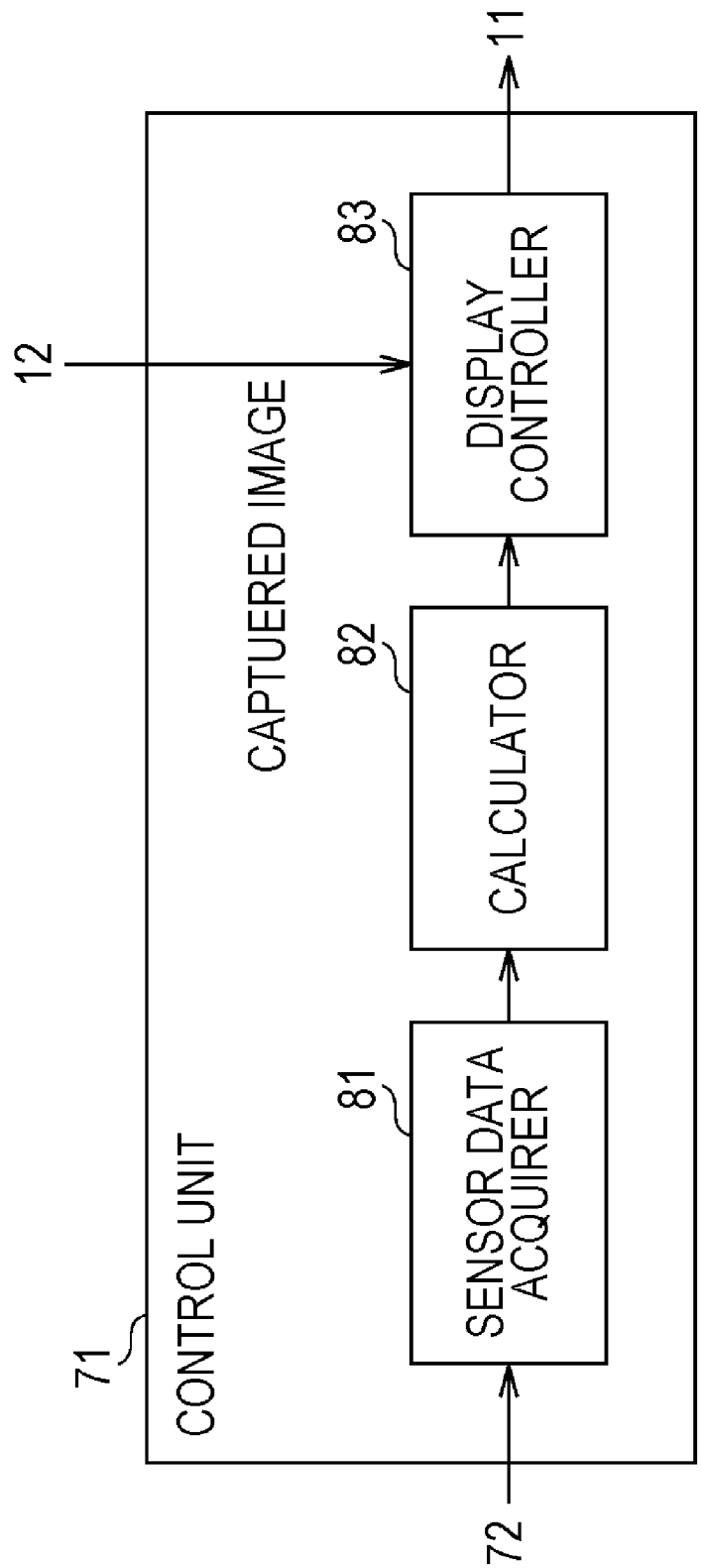
FIG. 17 is a block diagram showing an example of the functional configuration of a control unit.

FIG. 17 is a block diagram showing an example of the functional configuration of the control unit 71.

At least part of the functional blocks shown in FIG. 17 is realized by the control unit 71 in FIG. 16 that executes certain programs. In the control unit 71, a sensor data acquirer 81, a calculator 82, and a display controller 83 are realized.

The sensor data acquirer 81 acquires the sensor data output from the acceleration sensor 72 and outputs information about the acceleration occurring in the information processing terminal 1 to the calculator 82.

The calculator 82 calculates the display position and the size of each ring composing the indicator 51 on the basis of the information supplied from the sensor data acquirer 81.

For example, when an acceleration in at least one of the X-axis direction and the Y-axis direction is detected, the calculator 82 calculates positions shifted in a direction opposite to the acceleration direction by amounts corresponding to the magnitude of the acceleration as the display positions of the rings A to C. In addition, the calculator 82 calculates a position shifted in the same direction as the acceleration direction by an amount corresponding to the magnitude of the acceleration as the display position of the ring D.

When an acceleration in the −Z direction is detected, the calculator 82 calculates the sizes increased by the amounts of variation corresponding to the acceleration as the sizes of the rings A to C. In addition, when an acceleration in the +Z direction is detected, the calculator 82 calculates the sizes decreased by the amounts of variation corresponding to the acceleration as the sizes of the rings A to C.

When both of an acceleration in at least one of the X-axis direction and the Y-axis direction and an acceleration in the Z-axis direction are detected, the sizes of the rings A to C are calculated, in addition to the calculation of the positions of the rings A to D. The calculator 82 outputs information about the positions and the sizes of the respective rings obtained by the calculation to the display controller 83.

The display controller 83 identifies the positions and the sizes of the respective rings composing the indicator 51 on the basis of the information supplied from the calculator 82 and displays the indicator on a captured image displayed in the image display area 21.

<Operation of Information Processing Terminal 1>

A process of displaying the indicator performed by the information processing terminal 1 will now be described with reference to a flow chart in FIG. 18.

Figure 18:
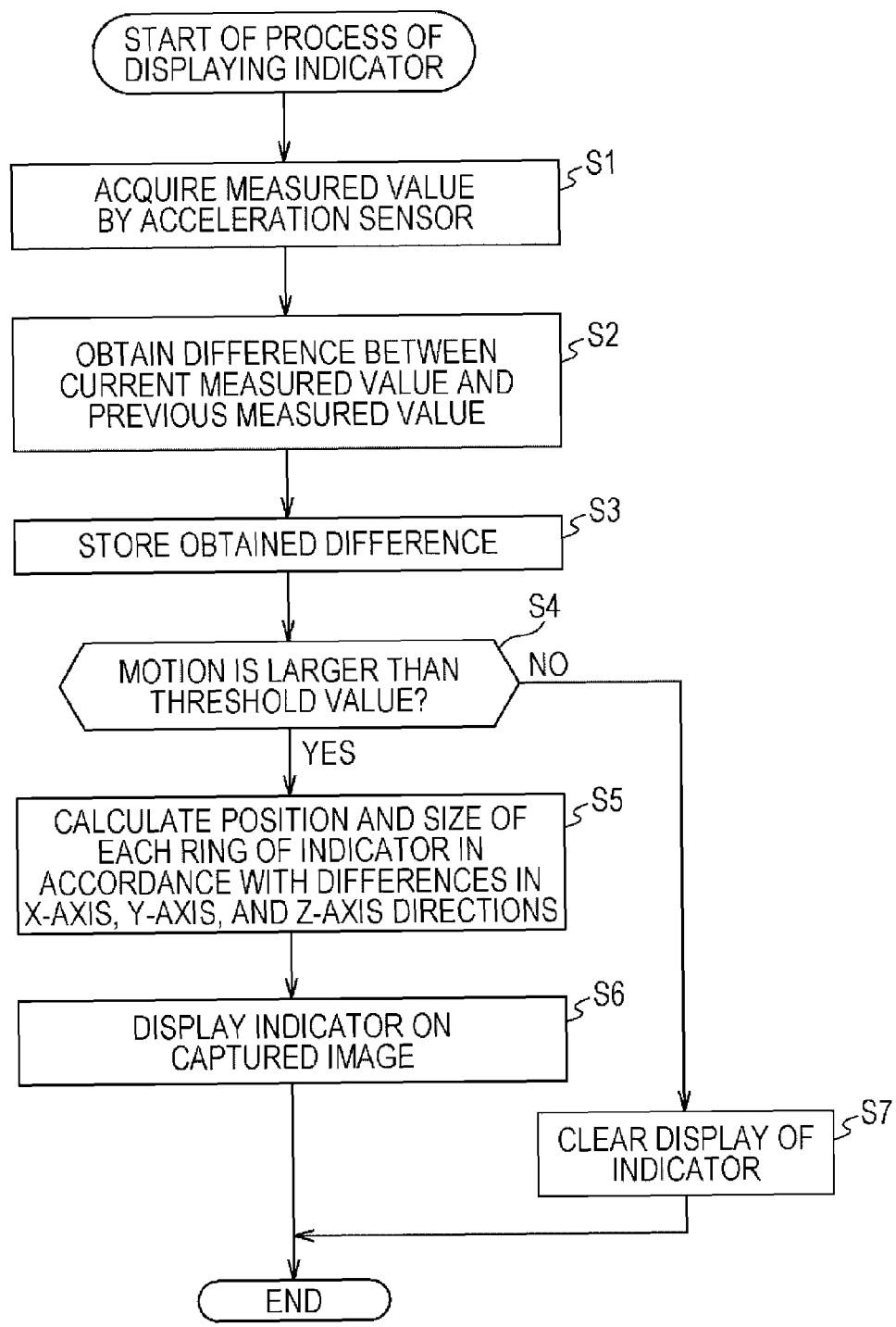
FIG. 18 is a flow chart describing a process of displaying the indicator performed by the information processing terminal.

The process in FIG. 18 is performed each time the acceleration sensor 72 measures an acceleration during activation of the camera application. Upon activation of the camera application, a captured image captured by the camera 12 is displayed in the image display area 21 on the display unit 11.

In Step S1, the sensor data acquirer 81 acquires a measured value by the acceleration sensor 72.

In Step S2, the calculator 82 obtains the difference between the current measured value and the previous measured value, which are acquired by the sensor data acquirer 81.

In Step S3, the calculator 82 stores the obtained difference of the acceleration.

In Step S4, the calculator 82 determines whether a motion occurring in the information processing terminal 1 is larger than a threshold value on the basis of the difference obtained in Step S2.

If the calculator 82 determines in Step S4 that the motion occurring in the information processing terminal 1 is larger than the threshold value, in Step S5, the calculator 82 calculates the position and the size of each ring composing the indicator 51 in the above manner in accordance with the accelerations in the X-axis direction, the Y-axis direction, and the Z-axis direction.

In Step S6, the display controller 83 displays the indicator 51 composed of the rings having the positions and the sizes obtained by the calculator 82 on the captured image.

In contrast, if it is determined in Step S4 that the motion occurring in the information processing terminal 1 is not larger than the threshold value, in Step S7, the display controller 83 clears the display of the indicator 51 when the indicator 51 has been displayed. When the indicator 51 has not been displayed, the display of the captured image is continued.

After the indicator 51 is displayed in Step S6 or after the display of the indicator 51 is cleared in Step S7, the process is terminated. The above process is repeated each time an acceleration is detected.

The information processing terminal 1 is capable of causing the user to have the mentality to arrange a target object at the center of the image display area 21 with the camera shake suppressed by displaying the indicator on the captured image in the above manner. The user is capable of adjusting the imaging range of the camera 12 in accordance with the display of the indicator 51 to intuitively arrange the target object at the center of the image display area 21 with the camera shake suppressed.

<Specific Example of Display of Indicator>

Figure 19:
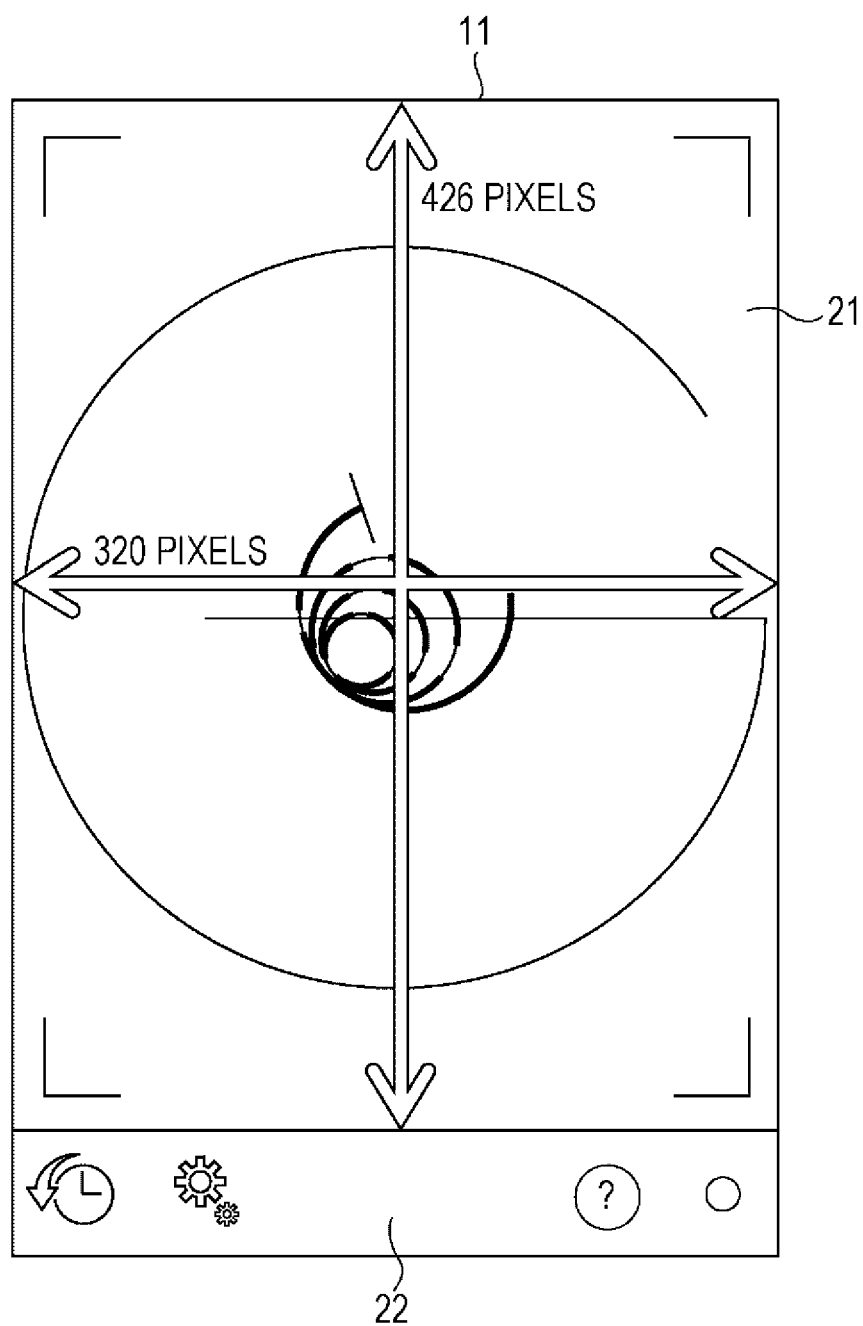
FIG. 19 is a diagram showing an exemplary structure of a screen in the display unit.

A specific example of the process to realize the display of the indicator described above will now be described. As shown in FIG. 19, it is assumed that the image display area 21 horizontally has 320 pixels and vertically has 426 pixels. The center of the image display area 21 is represented by x=160th pixel and y=213th pixel with respect to one pixel at the upper left corner.

FIG. 20 and FIG. 21 are diagrams for describing the flow of the process. The flow of the process shown in FIG. 20 and FIG. 21 is basically the same as the flow of the process described above with reference to FIG. 18.

Accelerations in the X direction, the Y direction, and the X direction, which are newly measured, are denoted by currentAccX, currentAccY, and currentAccZ. Accelerations in the X direction, the Y direction, and the X direction, which have been previously measured, are denoted by previousAccX, previousAccY, and previousAccZ.

In this case, the calculator 82 calculates accX, accY, and accZ in accordance with the following equations (1) to (3), as shown in the first to third lines in FIG. 20. In each equation, factor denotes a certain value.

$$accX = (currentAccX * factor) + (previousAccX * (1.0 - factor)) \quad (1)$$

$$accY = (currentAccY * factor) + (previousAccY * (1.0 - factor)) \quad (2)$$

$$accZ = (currentAccZ * factor) + (previousAccZ * (1.0 - factor)) \quad (3)$$

In addition, the calculator 82 calculates diffX, diffY, and diffZ in accordance with the following equations (4) to (6), as shown in the fourth to sixth lines in FIG. 20.

$$diffX = accX - previousAccX \quad (4)$$

$$diffY = accY - previousAccY \quad (5)$$

$$diffZ = accZ - previousAccZ \quad (6)$$

The calculation in the equations (1) to (6) corresponds to the processing in Step S2 in FIG. 18.

The calculator 82 stores diffX, diffY, and diffZ obtained by the equations (4) to (6) as previsouAccX, previsouAccY, and previsouAccZ, respectively, as shown in the seventh to ninth lines in FIG. 20. Storing previsouAccX, previsouAccY, and previsouAccZ corresponds to the processing in Step S3 in FIG. 18. PrevisouAccX, previsouAccY, and previsouAccZ stored here are used in the calculation when a next acceleration is acquired.

The calculator 82 calculates deltaX, deltaY, and deltaZ in accordance with the following equations (7) to (9), as shown in the tenth to twelfth lines in FIG. 20. For example, weight is equal to −650.

$$deltaX = diffX * weight \quad (7)$$

$$deltaY = diffY * weight \quad (8)$$

$$deltaZ = diffZ * weight \quad (9)$$

The calculator 82 performs calculation in the following equation (10), as shown in the thirteenth line in FIG. 20, to determine whether the obtained value is smaller than a threshold value. The threshold value is set to, for example, 40.0.

$$deltaX * deltaX + deltaY * deltaY + deltaZ * deltaZ \quad (10)$$

The processing in which the calculation in the equations (7) to (10) is performed and the value obtained by the equation (10) is compared with the threshold value corresponds to the processing in Step S4 in FIG. 18. If the value obtained by the equation (10) is smaller than the threshold value, the display of the indicator disappears, as shown in the fourteenth line in FIG. 20. If the value obtained by the equation (10) is larger than the threshold value, the display of the indicator is started, as shown in the sixteenth line in FIG. 20.

When the value obtained by the equation (10) is larger than the threshold value, the processing in which each ring (Focus) of the indicator 51 is drawn in accordance with the values of deltaX, deltaY, and deltaZ is performed, as shown in the first line in FIG. 21.

"MoveFocusA(deltaX, deltaY)" in the second line in FIG. 21 represents the processing in which the position of the ring A is moved in accordance with the values of deltaX and deltaY, and "resizeFocusA(deltaZ)" in the third line represents the processing in which the size of the ring A is varied in accordance with the value of deltaZ. "MoveFocusB(deltaX, deltaY)" in the fourth line represents the processing in which the position of the ring B is moved in accordance with the values of deltaX and deltaY, and "resizeFocusB(deltaZ)" in the fifth line represents the processing in which the size of the ring B is varied in accordance with the value of deltaZ. "MoveFocusC(deltaX, deltaY)" in the sixth line represents the processing in which the position of the ring C is moved in accordance with the values of deltaX and deltaY, and "resizeFocusC(deltaZ)" in the seventh line represents the processing in which the size of the ring C is varied in accordance with the value of deltaZ. "MoveFocusD(deltaX, deltaY)" in the eighth line represents the processing in which the position of the ring D is moved in accordance with the values of deltaX and deltaY.

The processing in the second and subsequent lines in FIG. 21 corresponds to the processing in Steps S5 and S6 in FIG. 18.

The tenth to fourteenth lines represent the processing of "moveFoxusA(deltaX, deltaY)." The X coordinate of the center of the ring A is obtained by the following equation (11), and the y coordinate of the center of the ring A is obtained by the following equation (12).

$$x = 160.0 + deltaX * 1.4 \quad (11)$$

$$y = 213.0 + deltaY * 1.4 \quad (12)$$

The coefficient 1.4 by which deltaX is multiplied in the equation (11) and the coefficient 1.4 by which deltaY is multiplied in the equation (12) are larger than coefficients used in equations to obtain the positions of the rings B, C, and D other than the ring A. As a result, the display of the indicator 51 in which the amounts of movement of the inner smaller rings are made large is realized, as described above.

The fifteenth to seventeenth lines represent the processing of "resizeFoxusA(deltaZ)." The size of the ring A is obtained by the following equation (13). The equation (13) represents calculation in which deltaZ is applied to a certain function f and the result of the application is multiplied by the coefficient 1.4.

$$focusA.resizeTo(1.4 * f(deltaZ) \quad (13)$$

The eighteenth to twenty-second lines represent the processing of "moveFoxusB(deltaX, deltaY)." The X coordinate of the center of the ring B is obtained by the following equation (14), and the y coordinate of the center of the ring B is obtained by the following equation (15).

$$x = 160.0 + deltaX * 1.0 \quad (14)$$

$$y = 213.0 + deltaY * 1.0 \quad (15)$$

The twenty-third to twenty-fifth lines represent the processing of "resizeFoxusB(deltaZ)." The size of the ring B is obtained by the following equation (16).

$$focusB.resizeTo(1.0 * f(deltaZ)) \quad (16)$$

The twenty-sixth to thirty lines represent the processing of "moveFoxusC(deltaX, deltaY)." The X coordinate of the center of the ring C is obtained by the following equation (17), and the y coordinate of the center of the ring C is obtained by the following equation (18).

$$x=160.0+\text{delta}X*0.6 \quad (17)$$

$$y=213.0+\text{delta}Y*0.6 \quad (18)$$

The thirty-first to thirty-third lines represent the processing of "resizeFoxusC(deltaZ)." The size of the ring C is obtained by the following equation (19).

$$\text{focus}C.\text{resizeTo}(0.6*f(\text{delta}Z)) \quad (19)$$

The thirty-fourth to thirty-eighth lines represent the processing of "moveFoxusD(deltaX, deltaY)." The X coordinate of the center of the ring D is obtained by the following equation (20), and the y coordinate of the center of the ring D is obtained by the following equation (21).

$$x=160.0-\text{delta}X*0.4 \quad (20)$$

$$y=213.0-\text{delta}Y*0.4 \quad (21)$$

In the equation (20), the value resulting from multiplication of deltaX by the coefficient 0.4 is subtracted from the x coordinate 160.0 of the center of the image display area 21. In addition, in the equation (21), the value resulting from multiplication of deltaY by the coefficient 0.4 is subtracted from the y coordinate 213.0 of the center of the image display area 21. As a result, the display of the indicator 51 in which only the ring D is slightly moved in the same direction as the acceleration direction is realized, as described above.

<Modifications>

Although the components of the indicator 51 have the circular shapes in the above description, the indicator 51 may have components having other shapes including linear shapes, such as triangles or quadrangles, or curved shapes.

In addition, although the reference position of the indicator 51 coincides with the center of the image display area 21 and the position of each ring is varied with respect to the center of the image display area 21, the indicator 51 may be displayed by using another position in the image display area 21 as the reference position. The user may select an arbitrary position as the reference position of the indicator 51. Alternatively, the face of a person appearing in the captured image may be recognized and the indicator 51 may be displayed by using the position of the face of the person as the reference position.

<Example of Configuration of Computer>

The series of processing described above may be performed by hardware or by software. When the series of processing is performed by software, the programs composing the software are installed from a program recording medium into a computer incorporated in dedicated hardware, a general-purpose personal computer, or the like.

FIG. 22 is a block diagram showing an example of the hardware configuration of a computer that performs the series of processing described above with programs.

A central processing unit (CPU) 101, a read only memory (ROM) 102, and a random access memory (RAM) 103 are connected to each other via a bus 104.

An input-output interface 105 is also connected to the bus 104. An input unit 106 including, for example, a keyboard and/or a mouse and an output unit 107 including, for example, a display and/or a speaker are connected to the input-output interface 105. In addition, a storage unit 108, which is, for example, a hard disk or a non-volatile memory, a communication unit 109, which is, for example, a network interface, and a drive 110 driving a removable medium 111 are connected to the input-output interface 105.

In the computer configured in the above manner, the CPU 101 loads programs, for example, stored in the storage unit 108 into the RAM 103 via the input-output interface 105 and the bus 104 and executes the programs to perform the series of processing described above.

The programs to be executed by the CPU 101 is, for example, stored in the removable medium 111 or supplied via a wired or wireless transmission medium, such as a local area network, the Internet, or digital broadcasting to be installed in the storage unit 108.

For information, the programs to be executed by the computer may be programs that perform the processing in time series in the order described in this description or may be programs that perform the processing in parallel or at required timing, such as in response to invocation.

The embodiments of the present technology are not limited to the embodiments described above and various modifications may be made without departing from the spirit and scope of the present technology.

For example, the present technology may have a cloud computing configuration in which one function is shared between multiple apparatuses via a network and the multiple apparatuses process the function in conjunction with each other.

In addition, each step described in the above flow chart may be shared between and executed by multiple apparatuses, instead of being executed by one apparatus.

Furthermore, when one step includes multiple processings, the multiple processings included in the one step may be shared between executed by multiple apparatuses, instead of being executed by one apparatus.

<Example of Combination of Configurations>

The present technology may also adopt the following configurations.

(1)

An information processing terminal includes an imaging unit that takes an image;

a display unit that displays the taken image;

a measuring unit that measures a motion occurring in the terminal itself; and a display control unit that displays an indicator composed of a plurality of components arranged in a nested structure on the image and varies a position and a size of each component in accordance with the motion.

(2)

The information processing terminal described in (1), wherein the display control unit varies the positions of the components in accordance with the motion in the directions of two axes that are defined on a face of the display unit and that are orthogonal to each other and varies the sizes of the components in accordance with the motion in the direction of an axis orthogonal to the two axes.

(3)

The information processing terminal described in (2), wherein the display control unit moves at least one of the plurality of components in a direction opposite to the direction of the motion.

(4)

The information processing terminal described in (2) or (3), wherein the display control unit moves the inner components by an amount larger than that of the outer components.

(5)

The information processing terminal described in any of (2) to (4), wherein the display control unit moves the outermost component, among the plurality of components, in the same direction as the direction of the motion.

(6)

The information processing terminal described in any of (2) to (5), wherein the respective components are arranged such that the center positions of the components coincide with each other when no motion occurs, and wherein the display control unit varies the positions of the respective components with respect to the center position.

(7)

The information processing terminal described in any of (2) to (6), wherein the display control unit varies at least one of the plurality of components so as to be decreased in size if the motion in a user direction along the axis orthogonal to the two axes is measured and so as to be increased in size if the motion in a direction opposite to the user direction is measured.

(8)

The information processing terminal described in (7), wherein, when the motion in the user direction is measured, the display control unit makes the amounts of variation of the outer components larger than the amounts of variation of the inner components to vary the components so as to be decreased in size.

(9)

The information processing terminal described in (7) or (8), wherein, when the motion in the direction opposite to the user direction is measured, the display control unit makes the amounts of variation of the inner components larger than the amounts of variation of the outer components to vary the components so as to be increased in size.

(10)

The information processing terminal described in any of (7) to (9), wherein the display control unit fixes the size of the outermost component, among the plurality of components.

(11)

The information processing terminal described in any of (7) to (10), wherein, when no motion occurs, the respective components are arranged such that the outer components and the inner components are spaced at regular intervals, and wherein the display control unit varies the sizes of the respective components with respect to the sizes when the outer components and the inner components are spaced at regular intervals.

(12)

The information processing terminal described in any of (7) to (10), wherein, when no motion occurs, the respective components are arranged so as to have the same size, and wherein the display control unit varies the sizes of the respective components with respect to the same size.

(13)

The information processing terminal described in any of (1) to (12), wherein, when the motion is not measured, the display control unit clears the display of the indicator.

(14)

An information processing method includes the steps of:
taking an image;
displaying the taken image;
measuring a motion occurring in the terminal itself; and
displaying an indicator composed of a plurality of components arranged in a nested structure on the image and varying a position and a size of each component in accordance with the motion.

(15)

A program causes a computer to execute a process including the steps of:
taking an image;
displaying the taken image;
measuring a motion occurring in the terminal itself; and
displaying an indicator composed of a plurality of components arranged in a nested structure on the image and varying a position and a size of each component in accordance with the motion.

REFERENCE SIGNS LIST 1 information processing terminal
11 display unit
12 camera
71 control unit
72 acceleration sensor
73 memory
74 communication unit
81 sensor data acquirer
82 calculator
83 display controller

The invention claimed is:

1. An information processing terminal comprising:
one or more central processing units (CPUs) configured to:
capture an image;
display the captured image;
measure a motion occurring in the information processing terminal; and
display an indicator composed of a plurality of components arranged in a nested structure on the displayed image and vary a position and a size of each of the plurality of components in accordance with the motion,
wherein the one or more CPUs are configured to vary the positions of one or more components among the plurality of components in accordance with the motion in the directions of two axes that are defined on a face of the information processing terminal and that are orthogonal to each other.

2. The information processing terminal according to claim 1, wherein the one or more CPUs are configured to vary the sizes of the one or more components among the plurality of components in accordance with the motion in the direction of an axis orthogonal to the two axes.

3. The information processing terminal according to claim 1, wherein the one or more CPUs are configured to move at least one of the plurality of components in a direction opposite to the direction of the motion.

4. The information processing terminal according to claim 1, wherein the one or more CPUs are configured to move inner components among the plurality of components by an amount larger than that of outer components among the plurality of components.

5. The information processing terminal according to claim 1, wherein the one or more CPUs are configured to move the outermost component, among the plurality of components, in the same direction as the direction of the motion.

6. The information processing terminal according to claim 1,
wherein the respective components are arranged such that the center positions of the plurality of components coincide with each other in case no motion occurs, and
wherein the one or more CPUs are configured to vary the positions of the respective components with respect to the center position.

7. The information processing terminal according to claim 1,
wherein the one or more CPUs are configured to:
decrease the size of at least one of the plurality of components if the motion in a user direction along the axis orthogonal to the two axes is measured, and
increase the size of at least one of the plurality of components if the motion in a direction opposite to the user direction is measured.

8. The information processing terminal according to claim 7, wherein, in case the motion in the user direction is measured, the one or more CPUs are configured to make the amounts of variation of outer components among the plurality of components larger than the amounts of variation of inner components among the plurality of components to decrease the size of the plurality of components.

9. The information processing terminal according to claim 7, wherein, in case the motion in the direction opposite to the user direction is measured, the one or more CPUs are configured to make the amounts of variation of inner components among the plurality of components larger than the amounts of variation of outer components among the plurality of components to increase the size of the plurality of components.

10. The information processing terminal according to claim 7, wherein the one or more CPUs are configured to fix the size of the outermost component among the plurality of components.

11. The information processing terminal according to claim 7,
wherein, in case no motion occurs, the respective components are arranged such that outer components among the plurality of components and inner components among the plurality of components are spaced at regular intervals, and
wherein the one or more CPUs are configured to vary the sizes of the respective components with respect to the sizes set in case the outer components among the plurality of components and the inner components among the plurality of components are spaced at regular intervals.

12. The information processing terminal according to claim 7,
wherein, in case no motion occurs, the respective components are arranged so as to have the same size, and
wherein the one or more CPUs are configured to vary the sizes of the respective components with respect to the same size.

13. The information processing terminal according to claim 1, wherein, in case the motion is not measured, the one or more CPUs are configured to clear the display of the indicator.

14. An information processing method comprising:
capturing an image by an information processing terminal;
displaying the captured image;
measuring a motion occurring in the information processing terminal; and
displaying an indicator composed of a plurality of components arranged in a nested structure on the displayed image and varying a position and a size of each of the plurality of components in accordance with the motion,
wherein the positions of one or more components among the plurality of components are varied in accordance with the motion in the directions of two axes that are defined on a face of the information processing terminal and that are orthogonal to each other.

15. A non-transitory computer readable storage medium having stored thereon, a set of computer-executable instructions for causing an information processing terminal to perform steps comprising:
capturing an image;
displaying the captured image;
measuring a motion occurring in the information processing terminal; and
displaying an indicator composed of a plurality of components arranged in a nested structure on the displayed image and varying a position and a size of each of the plurality of components in accordance with the motion,
wherein the positions of one or more components among the plurality of components are varied in accordance with the motion in the directions of two axes that are defined on a face of the information processing terminal and that are orthogonal to each other.

* * * * *